United States Patent
Ngol et al.

(10) Patent No.: US 6,611,080 B2
(45) Date of Patent: Aug. 26, 2003

(54) LINEAR PIEZOELECTRIC MOTOR WITH SELF LOCKING MEANS

(75) Inventors: Bryan Kok Ann Ngol, Singapore (SG); Lennie Enk Ng Lim, Singapore (SG); Wu Lin, Singapore (SG)

(73) Assignee: Nanyang Technological University, Singapore (SG)

( * ) Notice: Subject to any disclaimer, the term of this patent is extended or adjusted under 35 U.S.C. 154(b) by 78 days.

(21) Appl. No.: 09/871,722

(22) Filed: Jun. 4, 2001

(65) Prior Publication Data

US 2002/0180310 A1 Dec. 5, 2002

(51) Int. Cl.$^7$ ............................................... H01L 41/08
(52) U.S. Cl. .................... 310/323.02; 310/328
(58) Field of Search .............................. 310/328, 323.02

(56) References Cited

U.S. PATENT DOCUMENTS

| | | | |
|---|---|---|---|
| 4,570,096 A | | 2/1986 | Hara et al. |
| 4,857,791 A | | 8/1989 | Uchino et al. |
| 4,874,979 A | | 10/1989 | Rapp |
| 5,332,941 A | * | 7/1994 | Honda ................... 310/323.02 |
| 5,332,942 A | | 7/1994 | Rennex |
| 5,432,395 A | * | 7/1995 | Grahn ........................ 310/328 |
| 5,589,723 A | * | 12/1996 | Yoshida et al. ............. 310/328 |
| 6,188,161 B1 | * | 2/2001 | Yoshida et al. ............. 310/328 |
| 6,218,767 B1 | * | 4/2001 | Akada et al. .......... 310/323.02 |
| 6,242,846 B1 | * | 6/2001 | Ashizawa et al. ..... 310/323.02 |

OTHER PUBLICATIONS

Yutaka et al., "A Micropositioning Device for Precision Automatic Assembly using Impact Force of Piezoelectric Elements", Robotics and Automation, 1995. Preceedings, International Conference on vol. 1, 1995, pp.: 666–671. (To Be Furnished Upon Receipt).

Atsuo et al., "Linear Ultrasonic Piezoelectric Actuator", Industry Applications Soeciety Annual meeting, 1989., Conference Record of the 1989 IEEE, 1989, pp.: 203–206. (To Be Furnished Upon Receipt).

Takashi et al., "The Contact Mechanism of an Ultrasonic Motor", Applications of Ferroelectrics, 1990, IEEE. $7^{th}$ International Syposium on 1991, pp.: 535–538. (To Be Furnished Upon Receipt).

Physik Instrument (PI) GmbH&C.: Product Catalog (Non-opositioning, 1998). Print in Waldbronn, Germany. (To Be Furnished Upon Receipt).

Burleigh Instruments Inc.: The Power of Precision in Nan-opositioning. (1995) USA (To Be Furnished Upon Receipt).

King et al., "A Piezoelectric Harmonic Motor", in Mechatronics—the Basis for New Industry Development, 411–417, Computational Mechanics Press 1994, Acar, Makra & Penny Eds., ISBN 1–85312–367–6. (To Be Furnished Upon Receipt).

Yutaka et al., "A Micropositioning Device for Precision Automatic Assembly Using Impact Force of Piezoelectric Elements", Robotics and Automation, 1995. Preceedings, International Conference on vol. 1, 1995, pp.: 666–671.

Atsuo et al., "Linear Ultrasonic Piezoelectric Actuator", Industry Applications Society Annual Meeting, 1989., Conference Record of the 1989 IEEE, 1989, pp.: 203–206.

(List continued on next page.)

Primary Examiner—Mark O. Budd
(74) Attorney, Agent, or Firm—Burns, Doane, Swecker & Mathis, LLP

(57) ABSTRACT

A linear piezoelectric motor which includes a piezoelectric actuator; an actuator container which contains the piezoelectric actuator; an actuator slope which is supported by and slidably connected to an actuator slope support, the actuator slope is able to correspond with a surface portion of the actuator container; an output bar which shares a common axis with the actuator and the actuator container and comes in contact with at least one of the actuator and the actuator container on one end of the output bar and an axial load is applied on an opposite end of the output bar; and at least one output slope which is slidably connected to at least one output support.

15 Claims, 36 Drawing Sheets

OTHER PUBLICATIONS

Takashi et al., "The Contact Mechanism of an Ultrasonic Motor", Applications of Ferroelectrics, 1990, IEEE. 7$^{th}$ International Syposium on 1991, pp.: 535–538.

Physik Instrumente (PI) GmbH&C.: Product Catalog (Nanopositioning, 1998). Print in Waldbronn, Germany.

Burleigh Instruments Inc.: The Power of Precision in Nanopositioning. (1995) USA.

King et al., "A Piezoelectric Harmonic Motor", in Mechatronics—the Basis for New Industry Development, 411–417, Computational Mechanics Press 1994, Acar, Makra & Penny Eds., ISBN 1–85312–367–6.

* cited by examiner

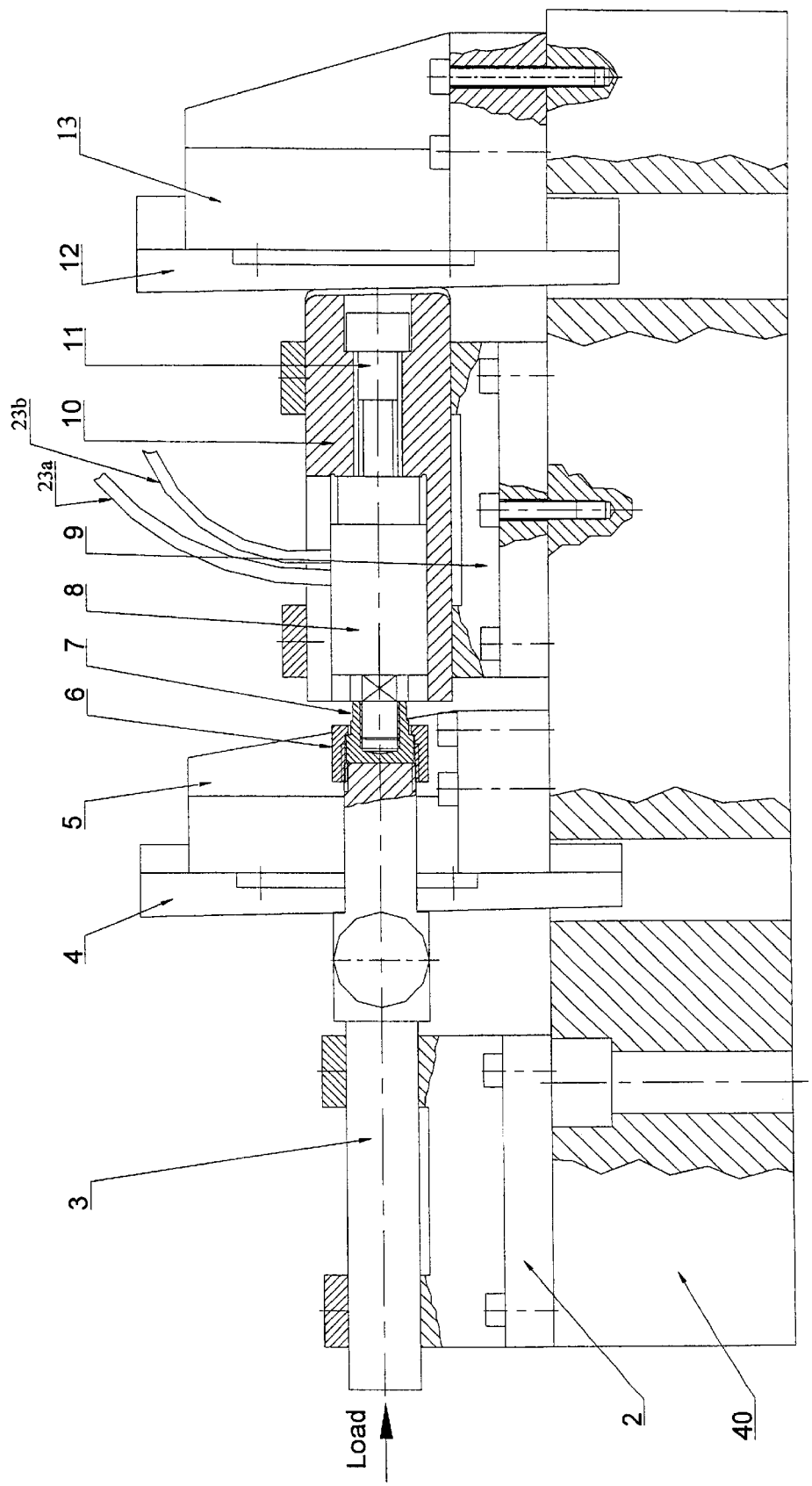

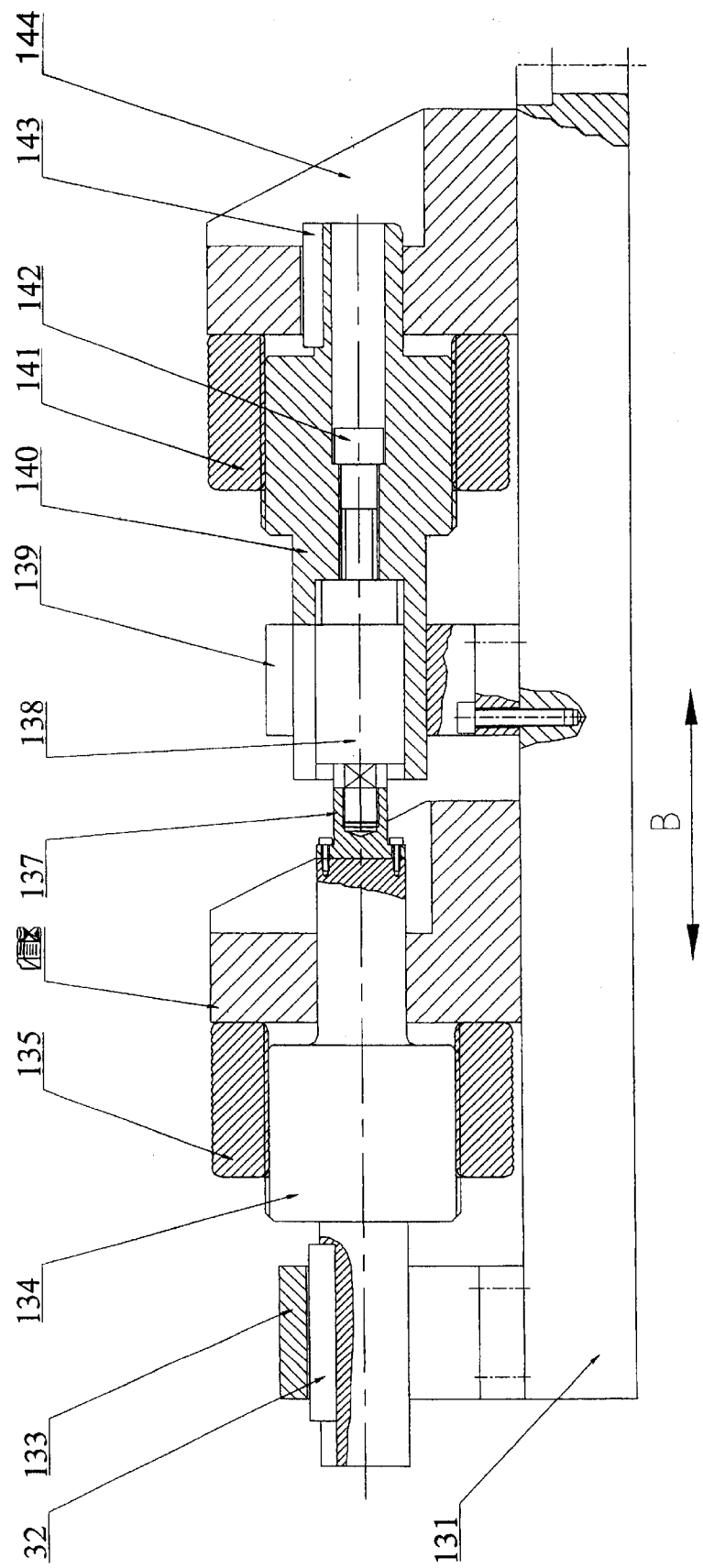

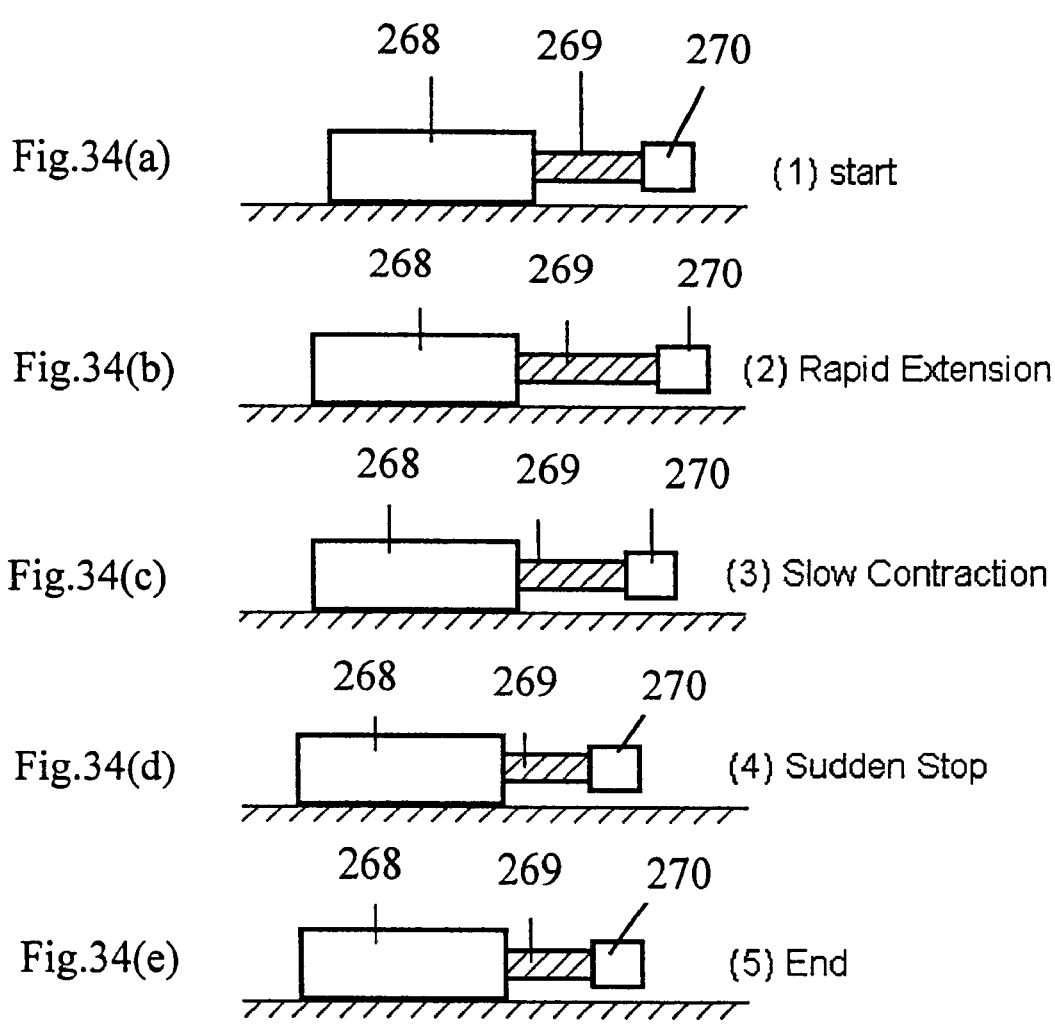

LINEAR PIEZOELECTRIC MOTOR WITH SELF LOCKING MEANS

FIELD OF THE INVENTION

The present invention relates to piezoelectric linear motors suitable for use as a driving source in machine tools, precision instruments and other machinery, where both linear positioning accuracy and high push force are essential.

BACKGROUND OF THE INVENTION

According to the driving mechanism, the existing linear piezoelectric motors can be mainly classified into three categories: the inchworm, the ultrasonic motor and the impact drive mechanism. Generally, these types of piezoelectric motors are used as a linear driving source for precision positioning. Compared with electromagnetic motors, piezoelectric motors have advantages, such as higher positioning accuracy, higher push force, compact size, and no electromagnetic wave is generated.

FIGS. 30(a) to 30(e) show the operation of an inchworm mechanism conventionally proposed as a linear motor. The inchworm mechanism is constructed of a shaft 254 and a tubular traveling body 250 axially movably engaged with the shaft 254. The traveling body 250 is composed of three tubular members (piezoelectric actuators) 251, 252 and 253 which are bonded together at respective axial ends by adhesive or the like. The central tubular member 252 is a piezoelectric actuator capable of axially expanding and contracting, and the opposite tubular member 251 and 253 are piezoelectric actuators capable of radially expanding and contracting. In operation, when the traveling body 250 is intended to be moved rightwardly, for example, as viewed in FIG. 31(a), the left tubular member 251 is radially contracted to grasp the shaft 254 under the condition where the central tubular member 252 is axially contracted and the right tubular member 253 is radially expanded as shown in FIG. 30(b). Then, the central tubular member 252 is axially expanded to thereby rightwardly move the right tubular member 253 (see FIG. 30(c)). Then, the right tubular member 253 is radially contracted to grasp the shaft 254, and the left tubular member 251 is expanded to be loosened (see FIG. 30(d)). Then, the central tubular member 252 is axially contracted to thereby rightwardly move the left tubular member 251 (see FIG. 30(e)). Accordingly, the traveling body 250 can be rightwardly moved by repeating the above operation. In the same principle, the shaft 254 can be also moved by fixing one of the tubular members.

The ultrasonic motor includes a driving member vibrated by the driving source, and the driving member is located in contact with a driven member, so that the vibration of the driving member in a driving direction may be frictionally transmitted to the driven member. The driving member generates a linear vibration of an elliptical vibration as a result of a synthesis of vibrations in two directions perpendicular to each other. Such an ultrasonic motor structurally consists of a vibrating reed type, a traveling wave type, etc.

FIG. 31 shows a typical linear ultrasonic piezoelectric motor constructed of a slider 255, an elastic bar 256, two supports 257 and piezoelectric elements 258. The piezoelectric elements are attached at the ends of the elastic bar 255 supported by member 257. The slider 256 is able to slide along the bar 255. The thrust force of ultrasonic actuators is produced by a traveling wave on the elastic bar 256 and particles at its surface move elliptically. The generation of the traveling wave is made by excitation of piezoelectric elements: two standing waves generate one traveling wave to either direction by combination of the electrical phase shift. The slider 255 in contact with the bar 256 is forced to move through friction force. The intuitive analogy may be "a surfboard on a wave".

FIG. 32 shows a vibrating reed type ultrasonic motor constructed of a piezoelectric vibrator 259 vibrating in its longitudinal direction and a vibrating reed 260 attached to the piezoelectric vibrator 259. The vibrating reed 260 is located in oblique contact with a surface of a driven motor 261, so that the driven member 261 may be driven by the vibrating reed 260 in a given direction.

FIG. 33 shows another ultrasonic linear motor having two legs 262 and 263 driving a rail 264. The legs 262, 263 and a connecting body 265 are vibrating members made of an elastic material such as aluminum. The legs are vibrated by piezoelectric elements 266, 267 mounted at an angle to the leg on one end of each leg. Generally, the phase difference in voltage to be applied to the vibration sources at about 90 degrees, so as to efficiently drive the linear motor. When the vibrating member is vibrated by the vibration source, a standing wave vibration is generated in the entire structure, which results in the generation of elliptical vibration at the free ends of the leg portions. Accordingly, when the free ends of the leg portions are disposed in contact with the driven member (the rail 264), the driving member and driven member move relative to each other.

FIGS. 34(a) to 34(e) show the operational procedure of the impact drive mechanism using piezoelectric elements. Rapid deformation of piezoelectric element is the source of the driving force. The motion mechanism consists of three components: a main object 268, a piezoelectric element 269 and a weigh 270 (see FIG. 34(a)). At first, the main object 268 is stopped. Then, a rapid extension of piezoelectric element 269 is made to generate an impulsive force and it moves the main object 268 against friction (see FIG. 34(b)). Then, the piezoelectric element 269 is contracted slowly so that the reactional force caused by the contraction should not exceed the static friction holding the main object 268 (see FIG. 34(c)). A sudden stop of the contraction may cause another step motion of the main object 268 (see FIG. 34(d)). FIG. 34(e) is the end of the work cycle.

SUMMARY OF THE INVENTION

Piezoelectric elements can produce very large push force and very fine displacement resolution. However, there is a common shortcoming for most existing linear piezoelectric motors: the push/holding force is limited by the friction induced at the interface of the stator and the rotor. For inchworm and ultrasonic motors, the motion generated by the piezoelectric elements is transmitted to the rotor by friction. Theoretically, the maximum output push force equals to the maximum static friction at the contact interface between the stator and the rotor. For the impact driving mechanism, the driving force is produced by the impact action induced by the piezoelectric element while the holding force is provided by the static friction as well. In order to transmit the greater push force that is generated by the piezoelectric actuator to the output completely, the self-lock mechanism is applied in this invention to feed and support the actuator and the output parts. In this way the fine displacement produced by the piezo-actuator is transferred to the output step by step.

The present invention provides a piezoelectric electric motor which enables precise positioning to be carried out, provides a self-lock effect, has a small power consumption and a large driving force.

The present invention provides in an exemplary embodiment the above mentioned advantages and other advantages discussed below, amongst other advantages, wherein a linear piezoelectric motor includes a piezoelectric actuator, an actuator container which contains the piezoelectric actuator; an actuator slope which is supported by and slidably actuator slope support, the actuator slope is able to correspond with a surface portion of the actuator container; an output bar which shares a common axis with the actuator and the actuator container and comes in contact with at least one of the actuator and the actuator container on one end of the output bar and an axial load is applied on an opposite end of the output bar; and at least one output slope which is slidably connected to at least one output support.

In another exemplary embodiment a linear piezoelectric motor is provided including a piezoelectric actuator; an actuator container which contains the piezoelectric actuator and holds the piezoelectric actuator; an actuator feeding screw which rotatably engages the actuator container and contacts a feeding support; and an output shaft which shares an axis with the piezoelectric actuator and the actuator container and is subjected to an applied load and rotatably engages an output feeding screw, the output feeding screw contacts an output feeding support.

BRIEF DESCRIPTION OF THE DRAWINGS

Preferred embodiment/s of the invention is/are disclosed in the following description and illustrated in the accompanying drawings, in which:

FIG. 4 illustrates a side cross-sectional view of the exemplary shown in FIG. 1;

FIG. 17 illustrates a side sectional view of the linear piezoelectric motor shown in FIG. 16;

FIG. 34 illustrates the operation of the impact driving mechanism according to the prior art.

DETAILED DESCRIPTION OF THE PREFERRED EMBODIMENT(S)

Figure 1:
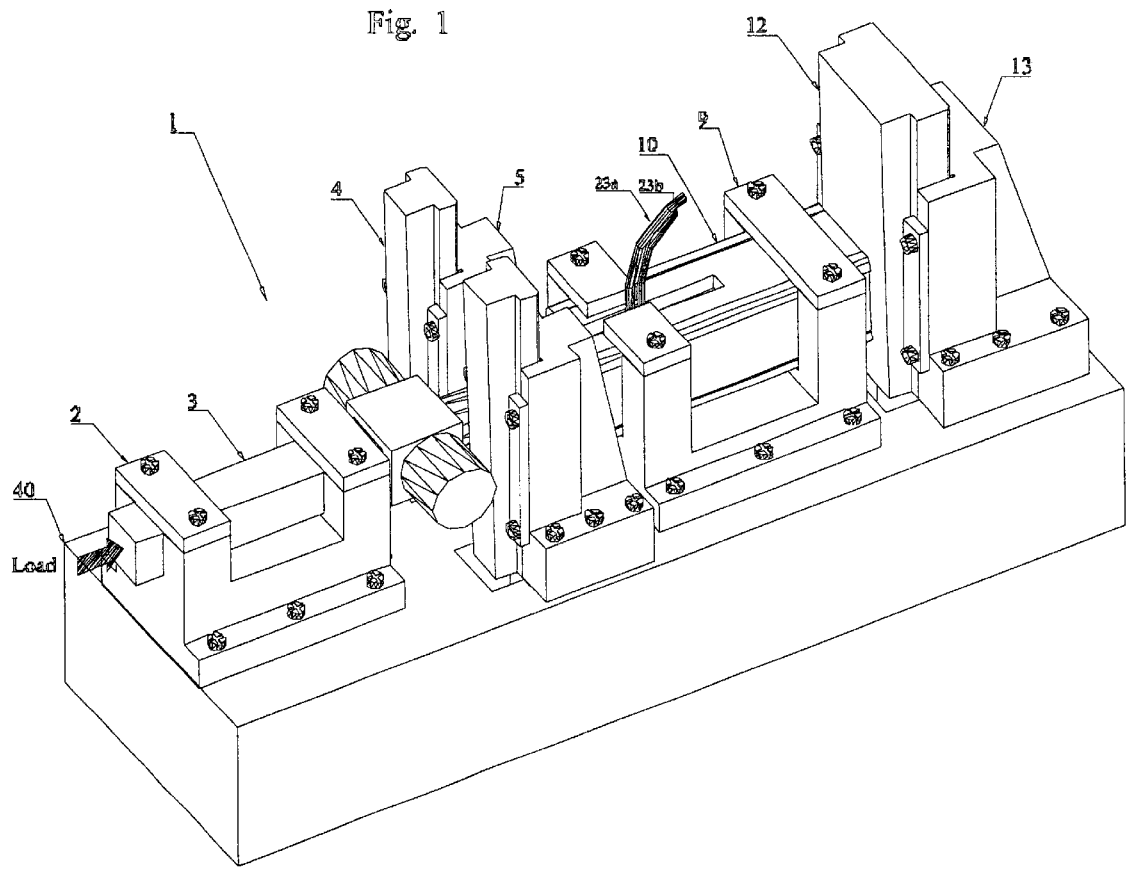
FIG. 1 illustrates a perspective view of an exemplary embodiment of a linear piezoelectric motor according to the present invention.

FIG. 1 is a perspective view of an exemplary embodiment of a linear bi-directional piezoelectric motor 1. The linear piezoelectric motor 1 includes an input group mainly located on the right portion of the linear bi-directional piezoelectric motor 1 and an output group mainly located on the left portion of the linear bi-directional piezoelectric motor 1.

The input group comprises an actuator container 10 having a slope 30 at one end, as shown in FIGS. 2(a)–2(e), and is able to travel linearly in a sliding way 9, and connection means 23a and 23b are held by the actuator container 10 and are connected to the piezoelectric actuator 8. The piezoelectric actuator 8 is able to extend and contract axially. The input group further includes a first slope 12 which comes in contact with the slope 30 of the actuator container 10. As shown in FIGS. 2(a)–2(e) the first slope 12 includes an angled surface 31 which comes in contact with slope surface 30 of the actuator container 10. The first slope 12 is supported by a first slope support 13.

The connecting nut 6 provides a link between the input group and the output group in function and structure. This allows that the extension and push forces generated by the actuator are transmitted to the output bar 3 completely which is a feature, amongst other features, that is not available in other existing piezoelectric motors, such an inchworm or ultrasonic motors.

The output group comprises an output sliding bar 3 traveling along an output support 2 and subjected to an axial force from the applied load, and two small slopes 4 for supporting and applying force to the output sliding bar 3. The two small slopes 4 are supported by two slope supports 5. The output support 2, sliding way 9, and slope supports 5, 13 are fixedly secured to the monolithic steel block 1. In an exemplary embodiment, the output support 2, sliding way 9, and slope supports 5, 13 are fixedly secured to the monolithic steel block 40 by a plurality of screws 31.

Figure 2A:
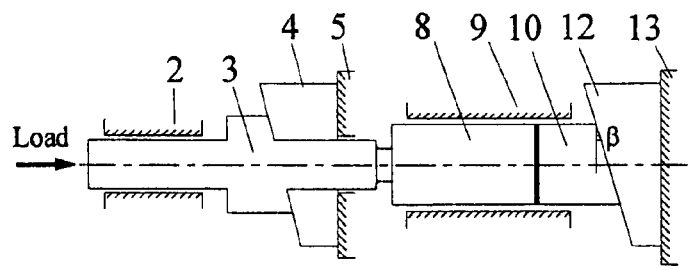
FIGS. 2a–2e illustrate a side-sectional view of linear piezoelectric motor according to FIG. 1, in the forward operation of the driving mechanism.

FIGS. 2(a)–2(e) illustrates the driving mechanism in the forward operation according to an exemplary embodiment as shown in FIG. 1. The forward operation includes the process where the linear motor of the present invention moves against the applied axial press force. Initially, the slope 12 is in contact with the actuator container 10. As shown in FIG. 2a, slope surface 31 of the slope 12 and the slope surface 30 of the actuator 10 are angled so that the slope surfaces 30 and 31 correspond and complement one another. This unique configuration allows for a self lock effect. The output bar 3 is subjected to an axial load on one end and supported by the two small slopes 4 at an opposite end, as shown in FIG. 2a.

Figure 2B:
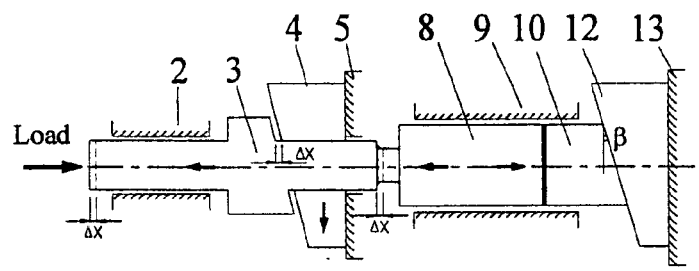
Figure 2C:
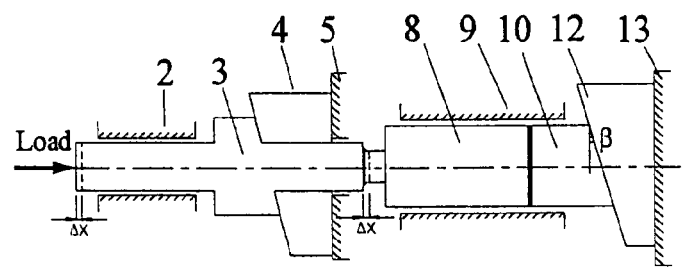
Figure 2D:
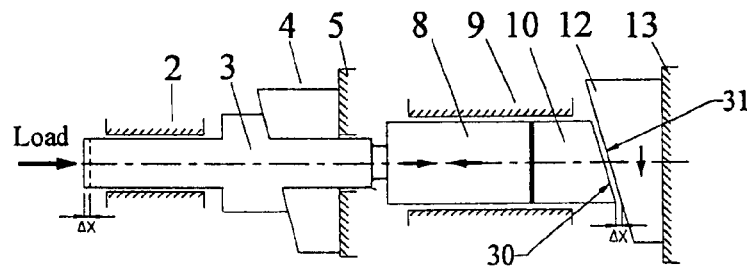
Figure 2E:
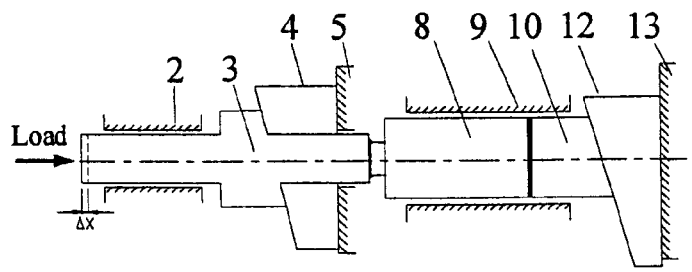

In FIG. 2b, the actuator 8 extends a distance of Δx, which accordingly causes the output bar 3 to be pushed in the direction against the axial load and also displaced by a distance of Δx. The long slope 12 which feeds the actuator container 10 does not move under the push force of the piezoelectric actuator 8 due to the self-lock effect caused by the unique configuration of the slope surfaces 30 and 31. FIG. 2(c) illustrates the two small slopes 4 which have been moved downwards to fill the clearance Δx, shown in FIG. 2b, located between the output bar 3 and the two small slopes 4. In FIG. 2d, the actuator 8 contracts, while the output bar 3 is still held in position by the two small slopes 4. Because of the self-lock effect, the slopes 4 do not move under the load of the output bar 3. However, because of the contraction of the actuator 8, another clearance distance of Δx is formed between the actuator container 10 and the slope 12, as shown in FIG. 2(d). As shown in FIG. 2(e), the slope 12 is then moved down automatically to fill the clearance distance of Δx formed by the contraction of the actuator 8. It should be appreciated that in an alternative embodiment that slope 12 could be controlled manually.

Figures 3A, 3B, 3C, 3D, 3E:
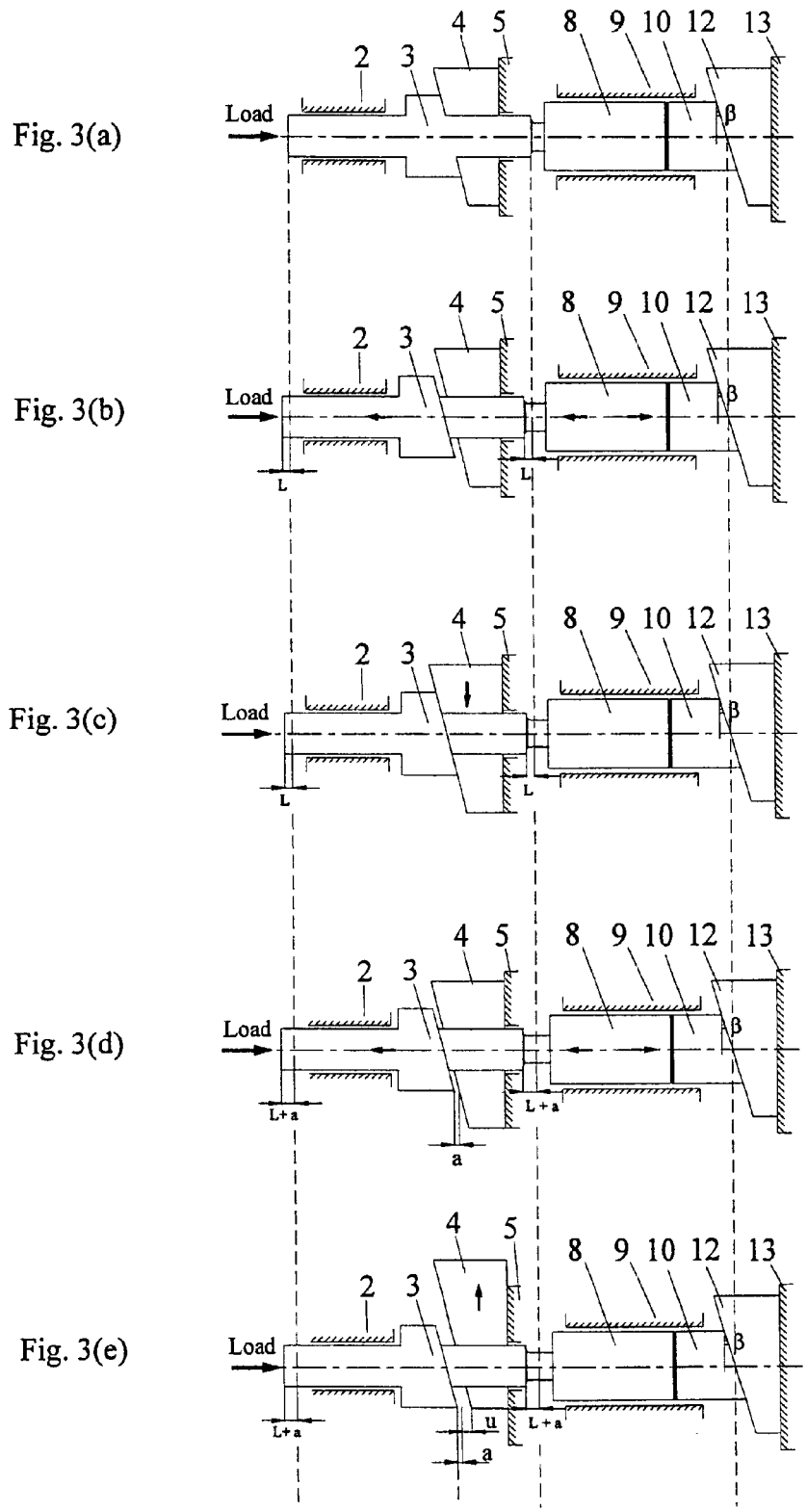
FIGS. 3(a) to 3(k) illustrate the driving mechanism in the reverse operation, in which the linear motor of present invention moves in the direction of the applied axial press force.

FIGS. 3(a) to 3(k) illustrate the driving mechanism in the reverse operation, in which the linear motor of present invention moves in the direction of the applied axial press force. To begin with, the piezoelectric actuator 8 should extend a length of L as shown in FIG. 3(b), which is limited by the following equation. The preparatory operation is shown in FIG. 3(a) to FIG. 3(c). The load is pushed ahead for a distance of L.

$$S-a>L>d$$

where

S—the stroke of the used piezo-actuator;

d—the motion step size;

a—the sum of all possible losses, e.g. elastic contact deformation, screw deflection.

Figures 3F, 3G, 3H, 3I, 3J, 3K:
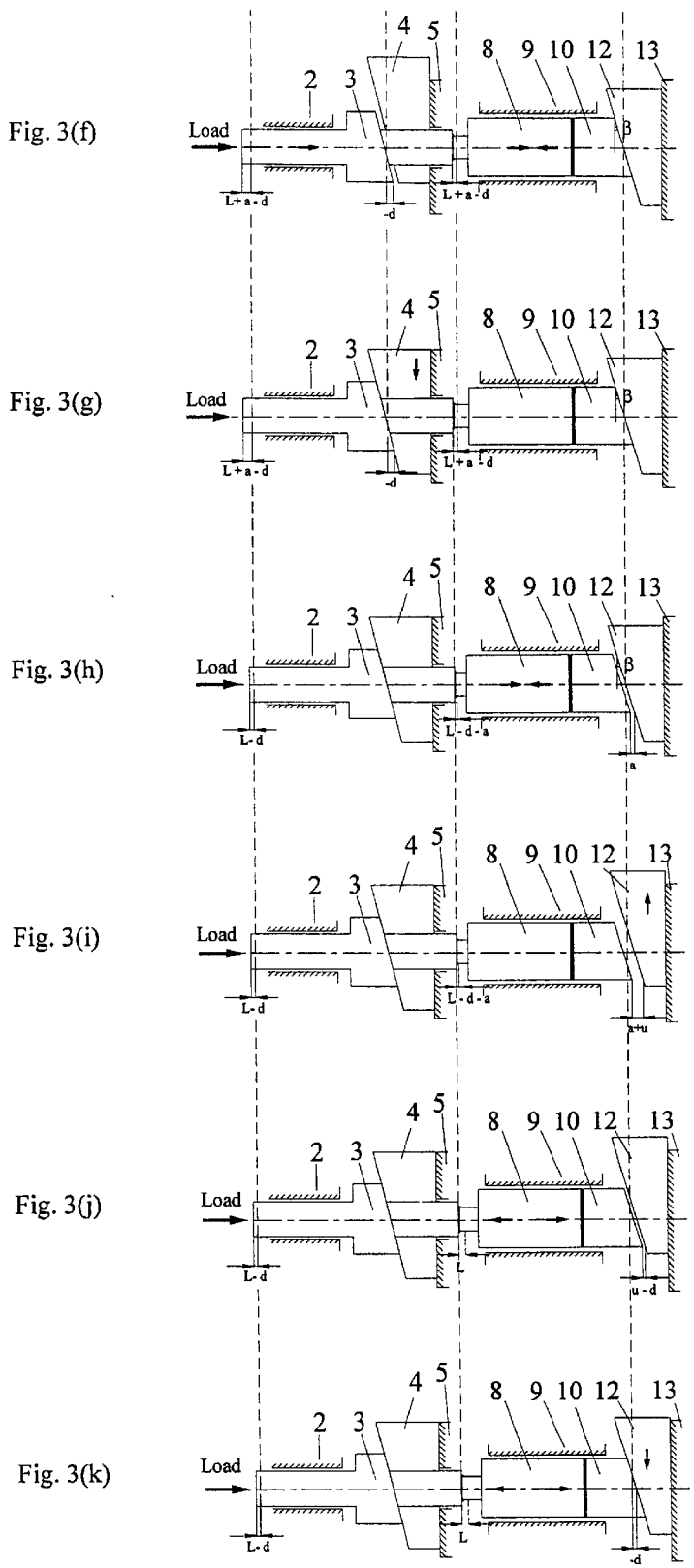

As shown in FIG. 3(d), in order to lift slope 4 vertically, actuator 8 continues to extend a length of a to uphold the axially applied load totally. In FIG. 3(e), slope 4 is raised. The horizontal distance between the output bar 3 and the slope 4 is u+a, where u is an arbitrary value which is larger than the motion step size d. For easy operation, the value of u can change from time to time as long as it is much larger than that of d. In FIG. 3(f), the actuator 8 contracts a distance of −d, where the minus sign represents the reverse movement. Compared to FIG. 3(c), the position of the left end of the output bar 3 is L+a−d.

In FIG. 3(g), the slope 4 moves down slowly until the slope surface of the slope 4 contacts the slope surface of the output bar 3. In FIG. 3(h), the actuator 8 contracts again for a distance from a to 2a so that slope 12 is free from the axial applied load. Because the left tip of actuator 8 is connected to the right end of output bar 3, the contraction separates the actuator container 10 from the slope 12. The slope 4 supports the total axial load under the assistance of the included self-lock effect. In the meantime, the extension a in FIG. 3(d) is compensated by the contact deformation between the slopes 4 and the output bar 3. The position of the left end of the output bar 3 is L−d. In FIG. 3(i), the slope 12 is lifted until the horizontal distance u is larger than the linear motion step size d. In FIG. 3(j), the actuator 8 extends until it resumes its extension of L. Compared with its previous position, the actuator 8 and actuator container 10 move a distance of −d in the reverse direction.

In FIG. 3(k), the slope 12 slides down slowly until it contacts the slope surface of the actuator container 10 again. After the procedures from FIG. 3(c) to FIG. 3(k), the output bar 3, the actuator 8 and the actuator container 10 move in the reverse direction for a distance of −d. Going to FIG. 3(d) to continue the procedures, the linear motor will move step by step in the reverse direction.

Figure 5:
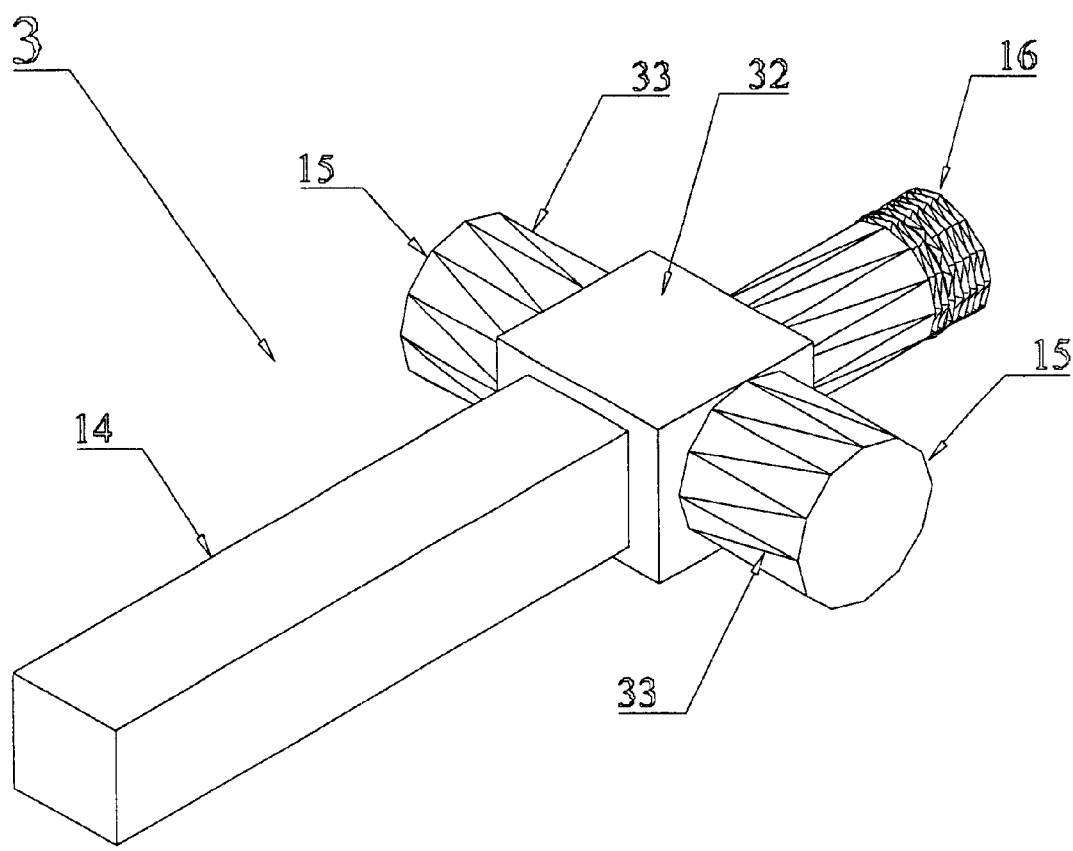
FIG. 5 illustrates a perspective view of the output bar, which in an exemplary embodiment has a cross-shaped configuration.

FIG. 4 illustrates a side cross-sectional view of the exemplary shown in FIG. 1. FIGS. 5–13 show more detailed views of the various parts of the linear piezoelectric motor 1. FIG. 5 illustrates a perspective view of the output bar 3, which in an exemplary embodiment has a cross-shaped configuration. The output bar 3 comprises a rectangular portion 14 connected to a main body portion 32. Protruding outwardly from opposing sides of the main body 32 are a two cylinderical portions 15. The outer surfaces 33 of the two cylinderical portions 15 come in contact with the two small slopes 4. A third cylinderical portion 16 extends from the main body 32 and in the opposite direction of the rectangular portion 14.

As shown in FIG. 4, the actuator 8 is fastened to the output bar 3 and actuator container 10 as its two ends by screws 7 and 11, respectively. When the actuator 8 contracts, the output bar 3 is held in position by slope 4 and the actuator container 10 is pulled to the left by the pulling force of the actuator 8. Slope 12 automatically slides down to fill the clearance between the actuator container 10 and the slope 12. If the actuator is not fastened to the output bar 3 and the actuator container 10 by screws 7 and 11, or other means, a clearance may take place between the output bar 3 and the actuator 8. To fill the clearance, slope 12 has to overcome the friction in guide way 9 to slide down so as to push the actuator 8 and actuator container 10 to move to the left. If the friction in guide way 9 is large enough, slope 12 may stop in half way or may not be able to completely slide down.

Figure 6:
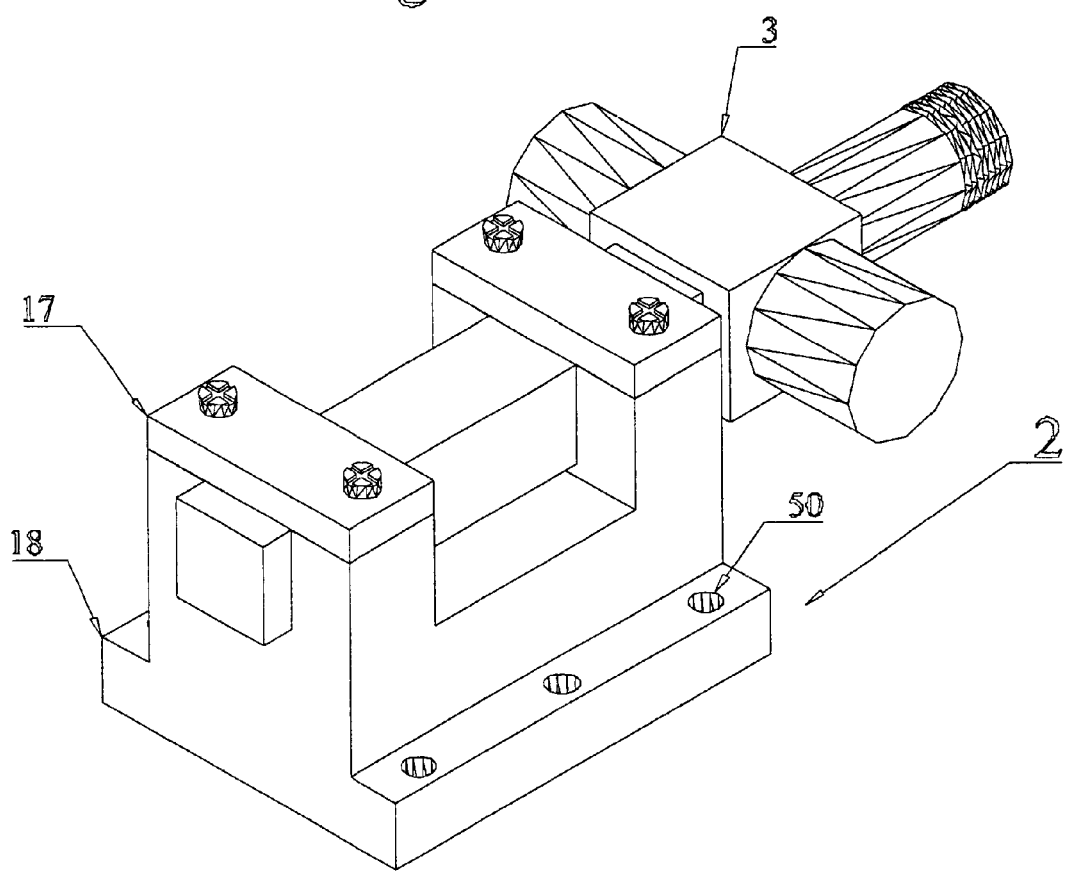
FIG. 6 illustrates a perspective view of the output bar being placed in the output support.

FIG. 6 illustrates a perspective view of the output bar 3 being placed in the output support 2. The output support 2 comprises a base 18 and two covers 17 which are fixed to the base 18 by a plurality of screws so as to form a guide way for the rectangular portion 14 of the output bar 3 to slide along. The guide way of the output support 2 limits the movement of the output bar 3 to a bi-directional axial direction. The plurality of holes 50 located on the bottom edge of the base 18 allow for screws or other attachment means to be received by the holes and fix the base 18 onto the monolithic base 40.

Figure 7:
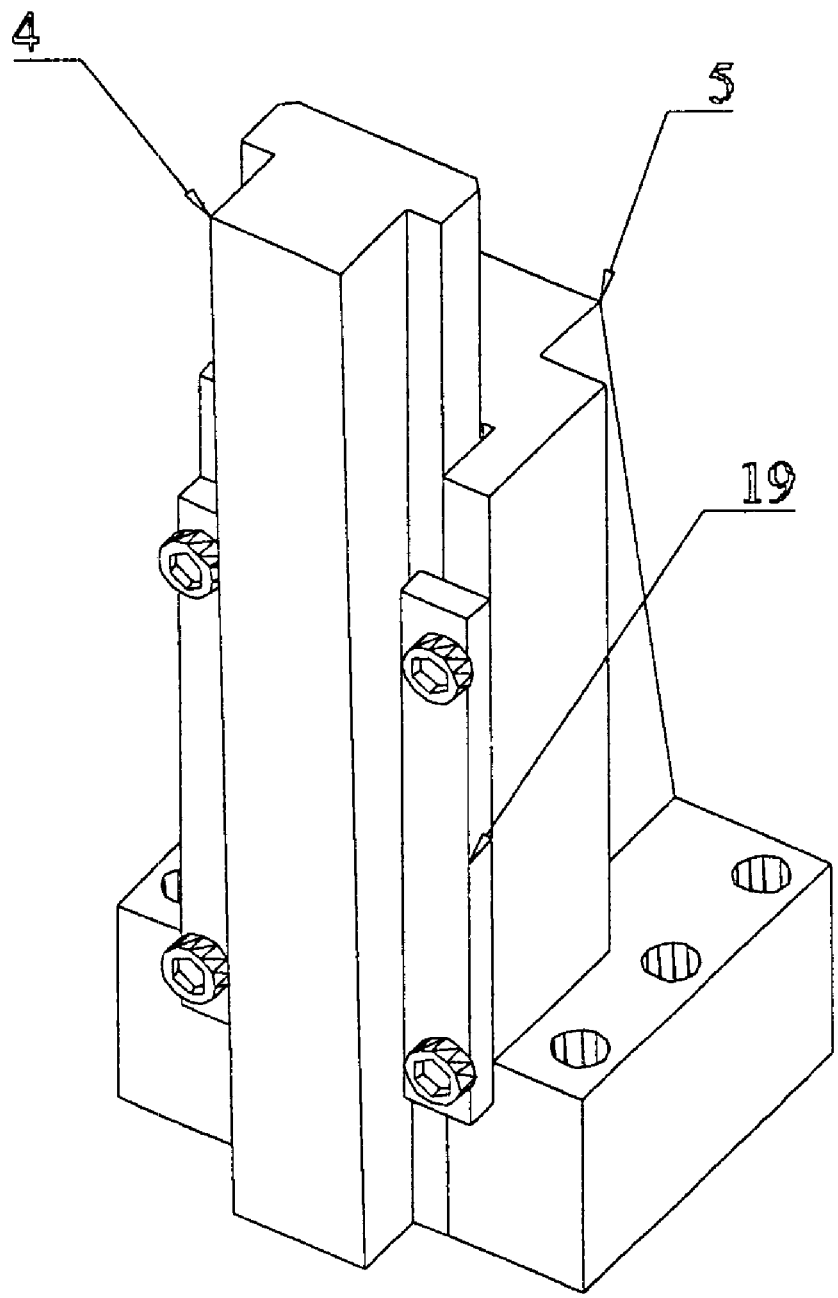
FIG. 7 illustrates a perspective view of one of the small slopes and its respective slope support.
Figure 8:
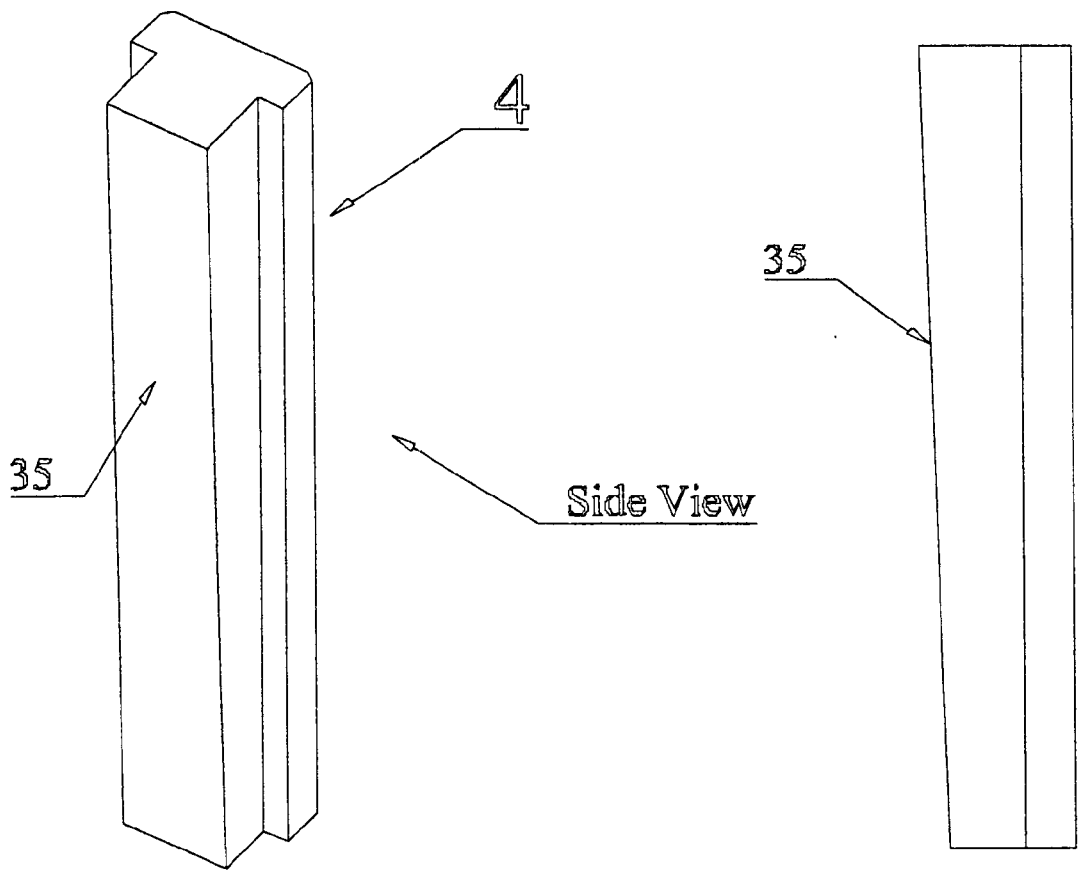
FIG. 8a is a perspective view of one of the small slopes.
FIG. 8b is a side view of the small slope.

FIG. 7 illustrates a perspective view of one of the small slopes 4 and its respective slope support 5. As shown in FIG. 7, the slope support 5 slidably recieves the slope 4 and allows for the slope 4 to slide along a guideway in a vertical direction. The slide covers 19 which are attachably connected to the slope support 5 assist in limiting the movement of the slope 4 in a vertical direction. However, it should be appreciated that the slide cover 19 may be fixedly attached. The slope support 5 also includes a plurality of openings which are also able to receive screws or other attachment means to fix the slope support 5 onto the monolithic base 40.

FIG. 8a is a perspective view of one of the small slopes 4. FIG. 8b is a side view of the small slope 4. As shown in FIG. 8b, the small slope 4 has a slope surface 35 which has a small slope angle. The angle of the slope surface 35 of the slope 4 should have an angle which would create the self-lock effect when subject to an axial force from the cylinder portions 15 of the output bar 3.

In order to produce the self-lock effect, the angle β for the slopes 4, 12 and the right end surface 30 of the actuator holder 10 should satisfy the following equation $$\beta \le \arctan\left(\frac{\frac{G}{P}+\mu_1+\mu_2}{1-\mu_1\mu_2}\right)$$

$$\beta \le \arctan\left(\frac{\frac{G}{P}+\mu_1+\mu_2}{1-\mu_1\mu_2}\right)$$

where:

G is the total weight of the slopes 4 and 12,

P is the axially applied load, $\mu_1$ is the friction coefficient at the contact interface of the slopes surface 30 and slope 12, $\mu_2$ is the friction coefficient in vertical guide way of the support 13. The value of β in an exemplary embodiment is given as 1.145° (or slope ratio 1:50).

The axial load is applied to the slope 4 and the slope support 5, except during the periods when the actuator 8 is in an extended state.

Figure 9:
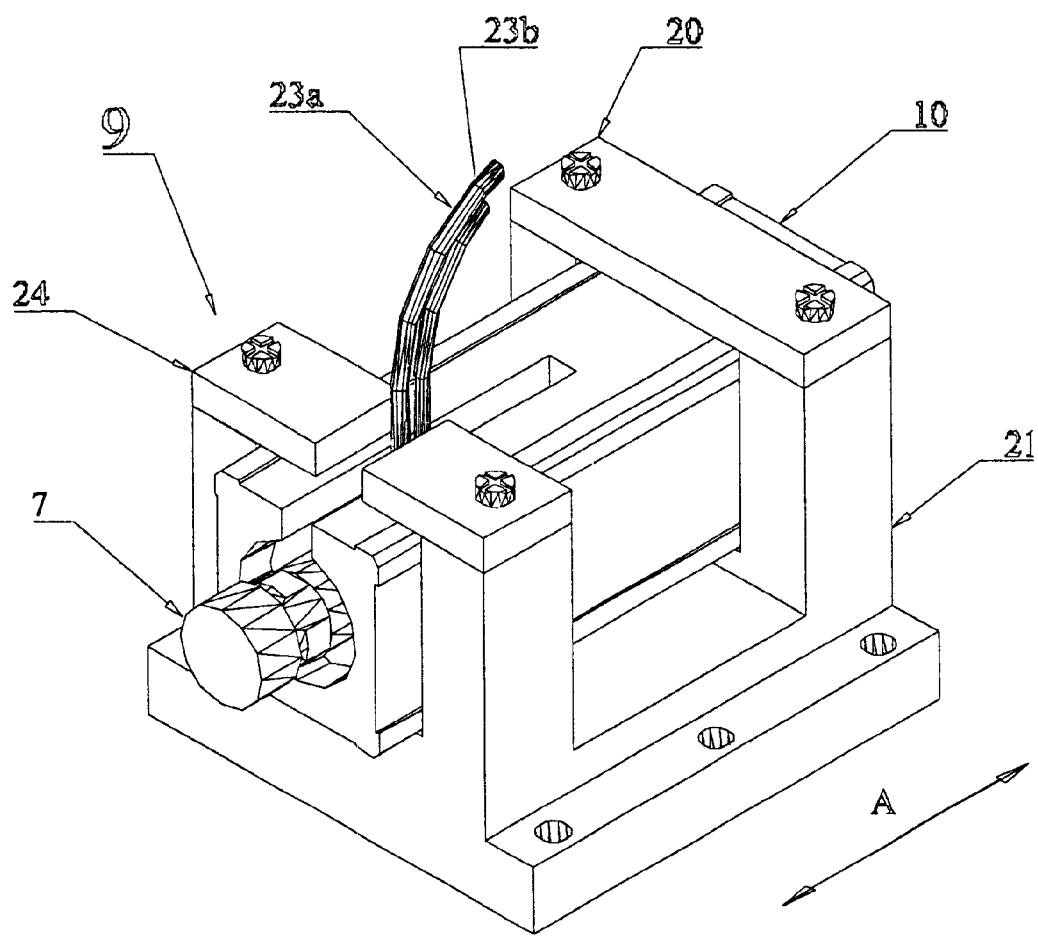
FIG. 9 is a perspective view of the piezoelectric actuator being positioned within the actuator container and container support.

FIG. 9 is a perspective view of the piezoelectric actuator 8 being positioned within the actuator container 10 and sliding way 9. As shown in FIG. 9, the piezoelectric actuator 8 is located within an opening in the actuator container 10 and a contact screw 7 is fastened at the tip of the actuator 8. The actuator container 10 includes a slot portion which enables the power cable 23a and the signal cable 23b to be connected to the actuator 8 and to protrude out from the actuator container 10 and connect to the desired devices. One end, as shown in FIGS. 2(a)–2(e), of the actuator container 10 includes a slope surface 30 which is able to correspond with the slope surface 31 of the slope 12 so that a surface contact between the actuator container 10 and the slope 12 is provided which allows for the self-lock effect.

In an exemplary embodiment, the sliding way 9 comprises a base 21 and guide covers 20, 24. A guide way is provided within the sliding way 9 which allows the sliding way 9 to receive the actuator 8 and the actuator container 10. Furthermore, in the exemplary embodiment the guide way is configured so that the movement of the actuator 8 and the actuator container 10 is restricted along a direction as shown by arrow A or horizontally with respect to the monolithic base 40.

Figure 10:
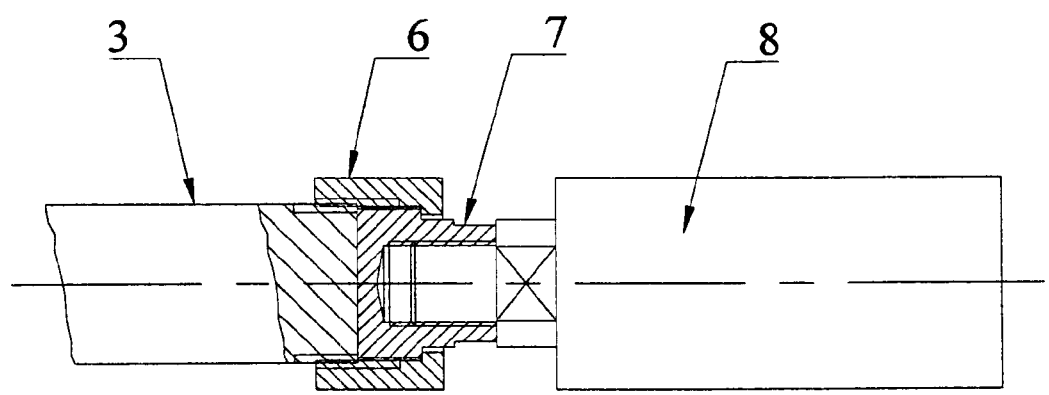
FIG. 10 illustrates a side sectional view of the connection between the actuator and the output bar.

FIG. 10 illustrates a side sectional view of the connection between the actuator 8 and the output bar 3. The connecting nut 6, which engages with the threads of the contact screw 7 at one end of the output bar 3, presses the contact screw 7 to contact the end surface of the output bar 3. If the actuator is not axially fixed to the output bar 3 or the actuator container 10 at its two ends respectively, the process of feeding the actuator 8 may be accomplished by the slope 12 sliding in a vertical direction with respect to the monolithic base 40. In one exemplary embodiment, the contact screw is attached to the output bar 3 because of a large bending moment, induced by the axial positional error under a large axial load, which may damage the actuator 8 if it is a free contact.

Figure 11:
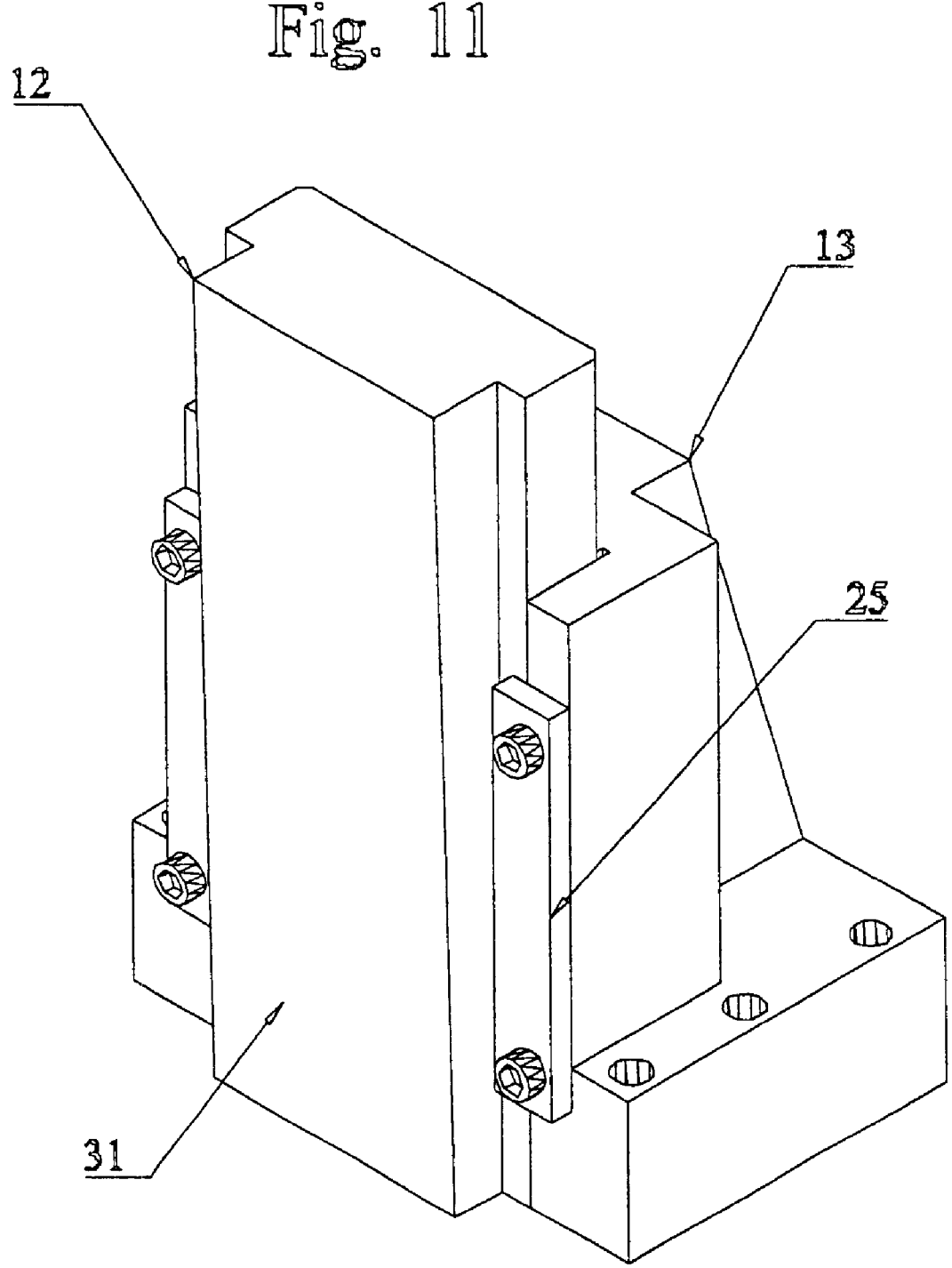
FIG. 11 illustrates a perspective view of the slope slidably connected to the slope support.
Figure 12:
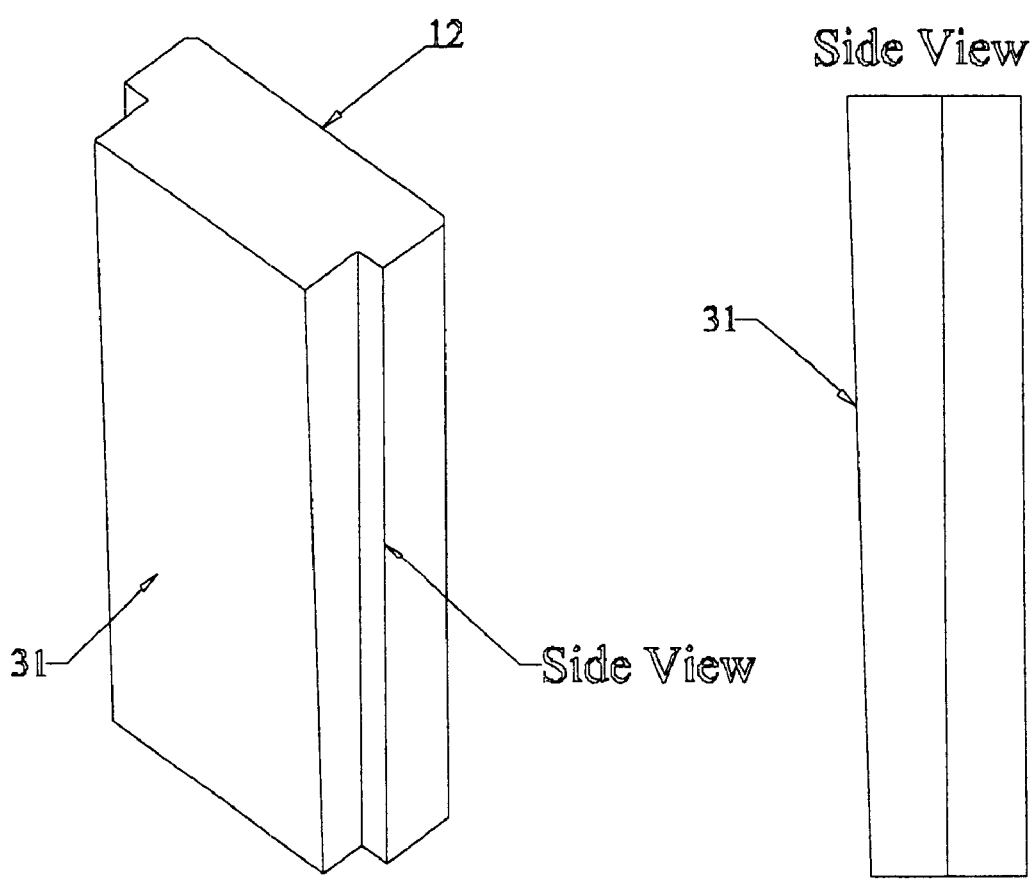
FIG. 12a is a perspective view of the slope.
FIG. 12b is a side view of the slope.

FIG. 11 illustrates a perspective view of the slope 12 slidably connected to the slope support 13. FIG. 12a is a perspective view of the slope 12 and FIG. 12b is a side view of the slope 12. The slope 12 and slope support 13 are similar in shape and function as the smaller slopes 4 and slope support 5, but the slope 12 and slope support 13 are larger in size. The slope support 13 also includes at least one slide cover 25 which is attachably connected to the slope support 13 to assist in restricting the movement of the slope 12 in a vertical direction with respect to the monolithic base 40.

Figure 13:
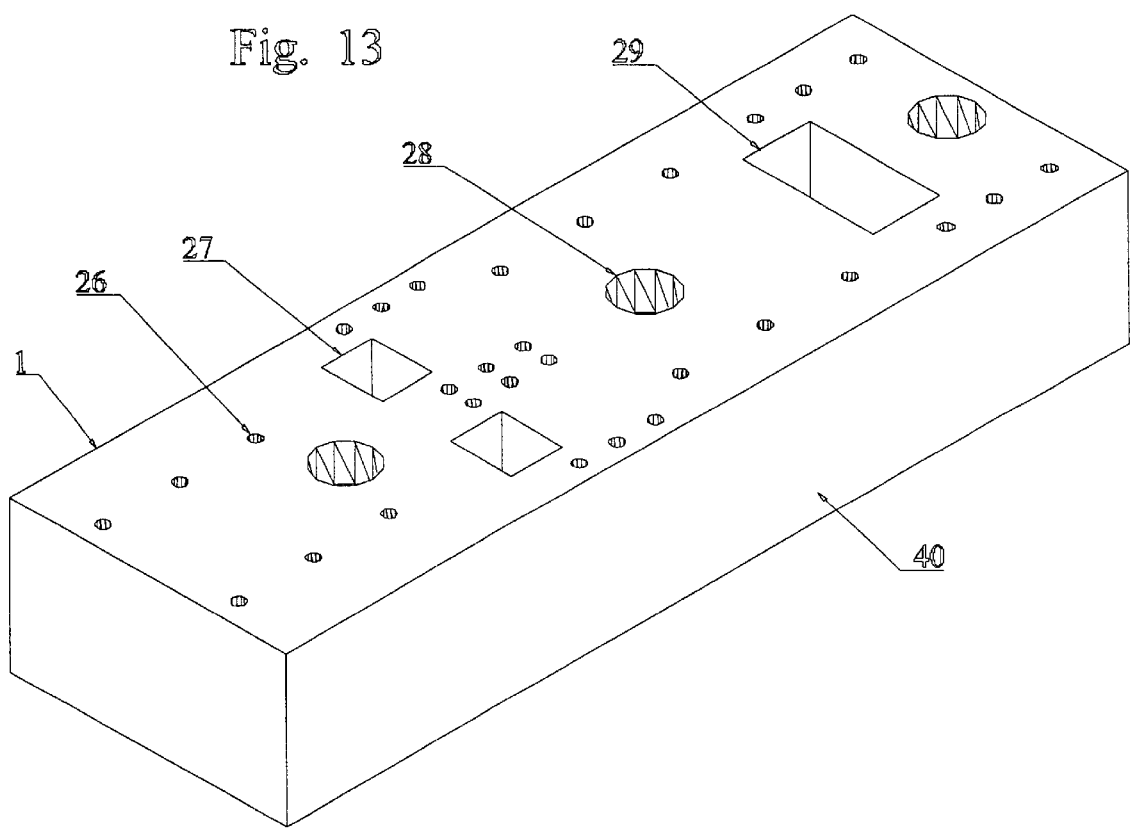
FIG. 13 is a perspective view of the monolithic base.

FIG. 13 is a perspective view of the monolithic base 40. The output support 2, slope support 5, container support 9 and the slope support 13 are all fixed to the monolithic base 40. The monolithic base 40 includes a plurality of openings which are able to receive attachments means to fix the respective parts to the monolithic base 30.

The driving mechanism proposed in this invention is different from those of existing piezoelectric motors. In general, this invention has two distinct characteristics when compared with existing piezoelectric motors. First, the displacement and push force produced by the piezoelectric actuator is transmitted to the output element directly and completely, while existing friction-type piezo-motors, such as ultrasonic motors and inchworm, are limited by the friction at the interface of stator and rotor. Second, the present invention provides the novel concept of self-lock in the design of piezoelectric motor. Unlike the friction-type piezoelectric motors, self-lock effect provides unlimited supporting force to the piezoelectric actuator and unlimited holding force to resist the applied load. Furthermore, because the motion of the piezoelectric actuator is transferred to the output element directly and completely, the motion resolution of the output element is the same as that of the used piezo-actuator (nanometer level) and the ultra-high positioning accuracy (within 10 nanomenters) has been achieved in the finished experiments.

Figure 14:
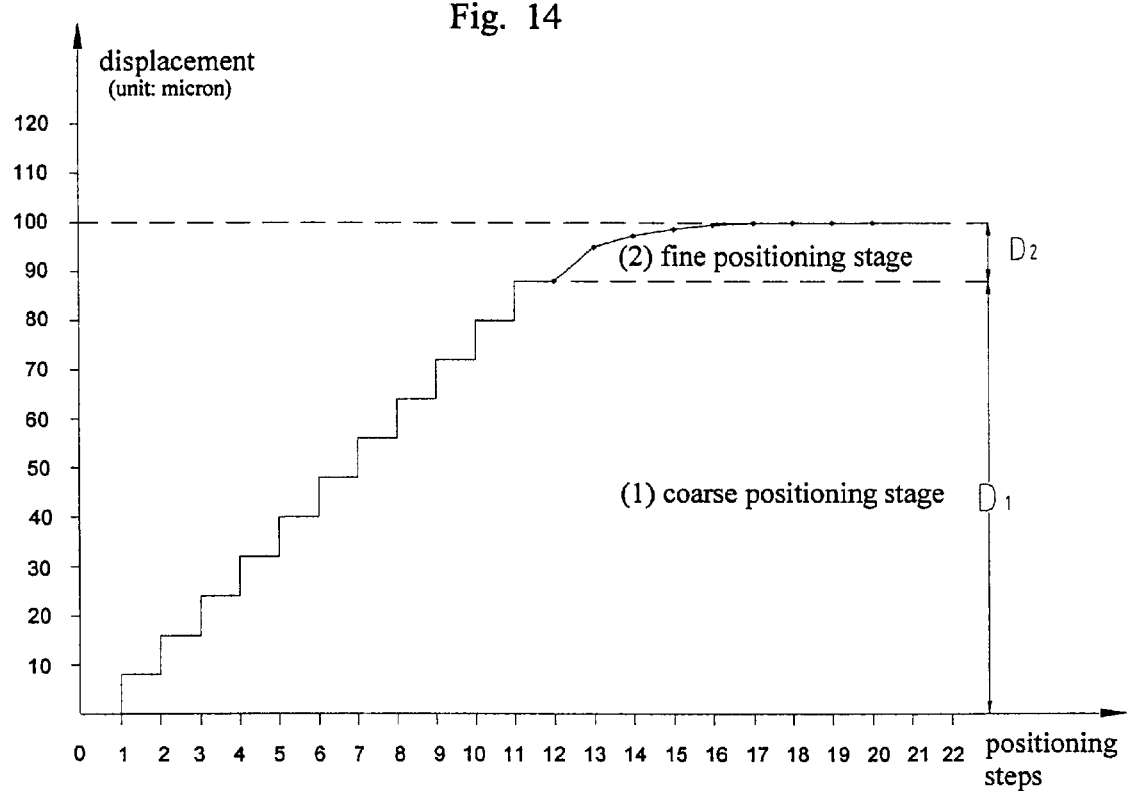
FIG. 14 illustrates the hybrid-positioning stragedy used in the positioning operation.

To achieve ultra-high positioning accuracy, hybrid-positioning strategy (for forward operation) is used as in shown FIG. 14. For example, if it is required to move a distance of 100.000 μm under a given load, two positioning processes are carried out: coarse positioning and fine positioning. Coarse positioning is accomplished by the motion of the linear motor, which looks like stairs in (1) of FIG. 14. Fine positioning is achieved by the stepwise extension of the piezoelectric actuator, as is shown in fine positioning stage (2) in FIG. 14. Starting fine positioning is decided by a given value $D_2$ which is less than the stroke of the used piezo-actuator. In this example, $D_2$ is set to be 10 μm which is less than the stroke 15 μm of the used piezo-actuator. It is found that the final positioning accuracy is only decided in the fine positioning stage (2) rather than the coarse position stage (1), i.e. the distance value $D_1$ does not influence the final accuracy. With the hybrid-positioning strategy, ultra-high positioning accuracy is available both in long and short distance positioning.

Figure 15:
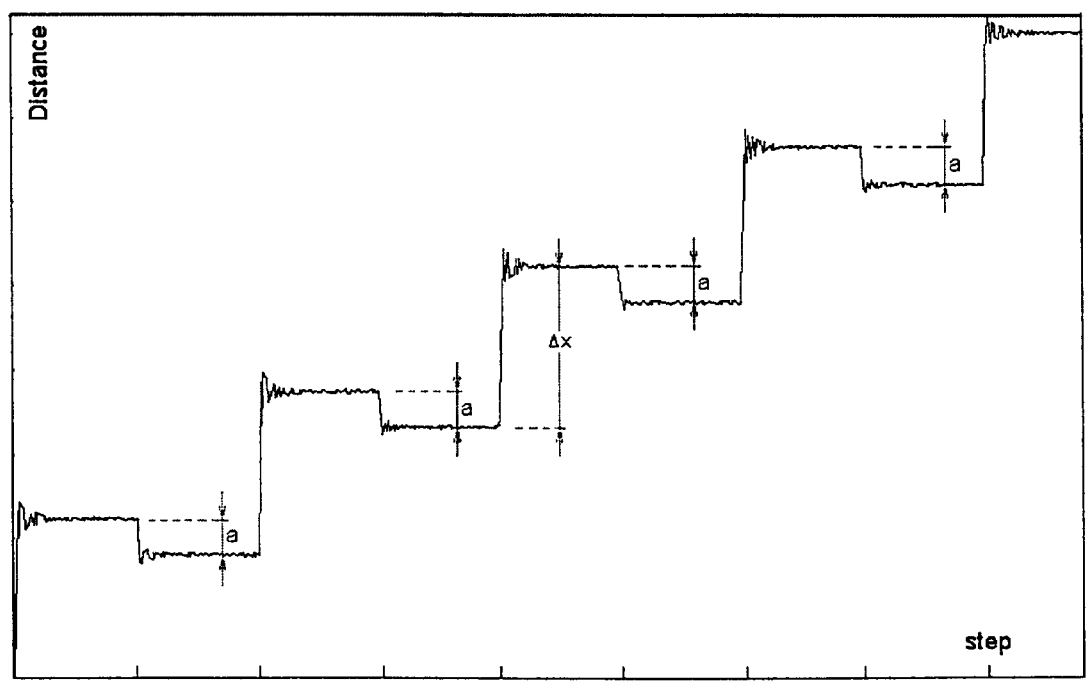
FIG. 15 illustrates a graph of the enlarged forward motion step.

The motion steps are not as perfect as the simplified stairs shown in the coarse positioning stage of FIG. 14. Because of the elastic contact deformation between cylinder 15 and slope 4 and the beam deflection of cylinder 15, the output bar 3 withdraws a distance of a, the sum of all elastic contact deformation and deflection, when the procedure of actuator contraction in FIG. 2(d) is carried out. The value of a relates to the load, material property of the contact surfaces, contact types, etc. The enlarged image of the motion step is shown in FIG. 15.

The self-lock effect can be provided by a linear motor driving device having a screw thread as long as the helix angle of the thread is small enough. Thus, in another exemplary embodiment as shown in FIGS. 16–29 a screw thread replaces the slopes 4 and 12 to support and feed the piezoelectric actuator 8 and the load applied on the output bar 3.

Figure 16:
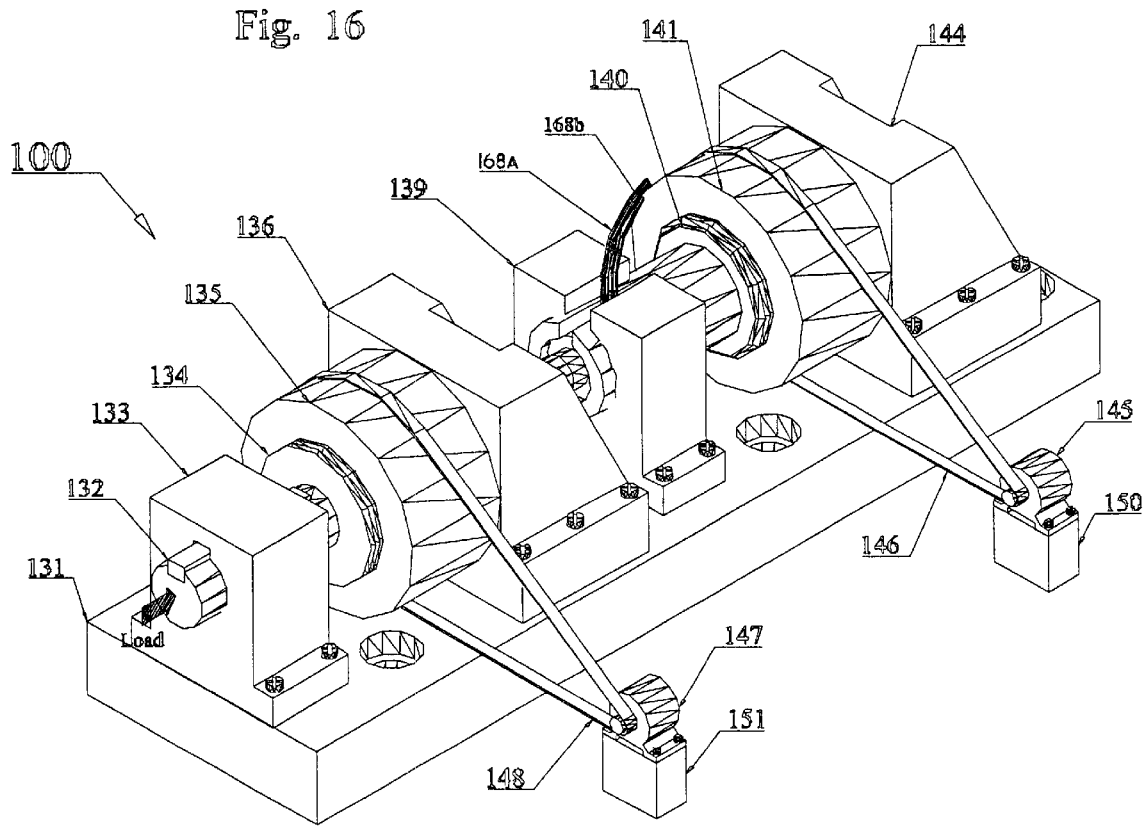
FIG. 16 illustrates a perspective view of another exemplary embodiment of a linear piezoelectric motor with a self lock feature.

FIG. 16 illustrates a perspective view of the exemplary embodiment of a linear piezoelectric motor 100 having feeding screws 135 and 141. FIG. 17 illustrates a side sectional view of the linear piezoelectric motor 100 shown in FIG. 16. Similar to the embodiment shown in FIG. 1, the exemplary embodiment shown in FIG. 16 also includes an input group and an output group.

The input group comprises a piezoelectric actuator 138, contact cap 137, actuator holder 140, feeding screw 141, support 139, screw 142, support 144 and key 143. The output group includes output shaft 134, support 133, feed screw 135, support 136 and key 132. It should be noted in the exemplary embodiment shown, components 134, 135, 137, 138, 140 and 141 share a common axis. Feeding screws 135 and 141, which engage the output shaft 134 and actuator holder 140, respectively, are able to revolve around the axis. Furthermore, keys 132 and 143 restrict the rotational movement around the axis of the output shaft 134 and actuator holder 140, respectively, but allow for the output shaft 134 and the actuator holder 140 to slide in the direction of arrow B or in a horizontal direction with respect to the monolithic base 131.

The feeding screws 135 and 141 are driven by two small DC motors 145 and 147, respectively, which are connected by belts 146 and 148. The torque of the DC motors 145 and 147 can overcome the friction induced by the engagement of threads, but can not move the axially applied load. The motors 145 and 147 operate only in the intervals between the extension and contraction of the actuator 138. Thus, the motors 145 and 147 do not effect the positioning of the axial load. Blocks 150 and 151 are used to support the motors 145 and 147. The tension of the belts 146 and 148 may be adjusted by altering the positions of the blocks 150 and 151.

FIGS. 18(a) to 18(e) illustrate the forward operation procedures, in which the intended displacement is against the applied load F. The extension of the actuator 138 is zero in FIG. 18(a). The axial load F applied to the shaft 134 is countered by the feeding screw 135 under the support of the self-lock effect induced between the shaft 134 and the feed screw 135, while the actuator 138, the actuator holder 140 and the feeding screw 141 are free of the axial load.

Figure 18A:
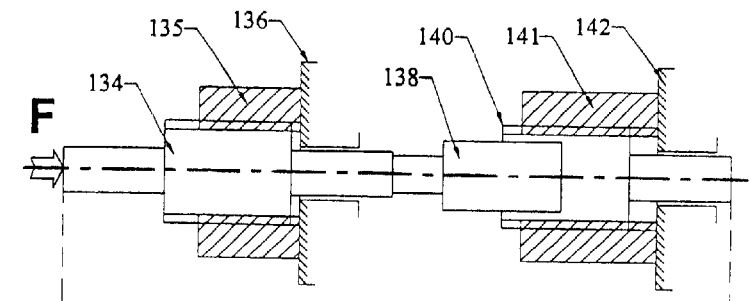
FIGS. 18(a)–18(e) illustrate the driving mechansim of the forward operation of the second exemplary embodiment shown in FIG. 16.
Figure 18B:
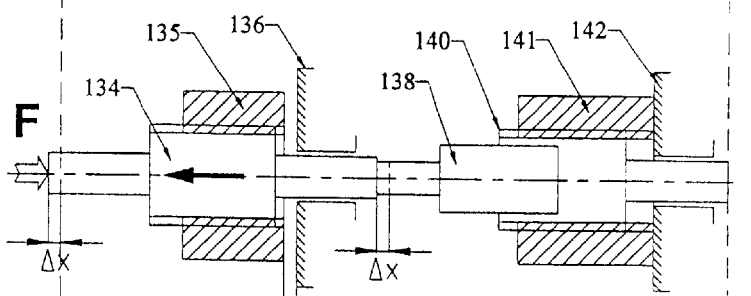
Figure 18C:
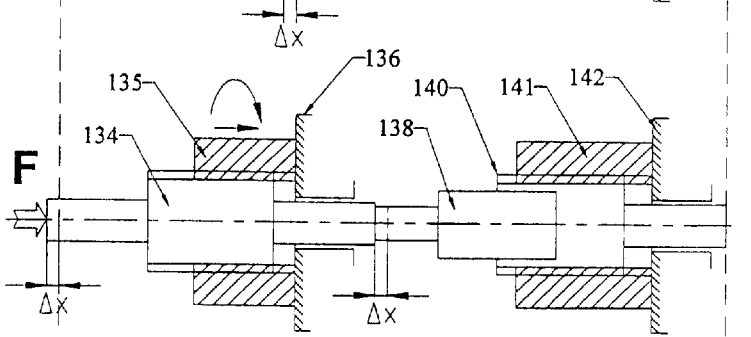

In FIG. 18(b), the actuator 138 extends to move the shaft 134 and the feeding screw 135 ahead for a distance Δx. The feeding screw 135 loses contact with support 136 and the axial load F is totally applied to the feeding screw 141. With the support of the self-lock effect provided by the threads of the actuator holder 140 and the feeding screw 141, the applied load F is sustained in FIG. 18(b). In FIG. 18(c), the feeding screw 135 turns back to come in contact with the support 136. The small feeding torque is able to rotate the feeding screw 135 only when the screw is not pressed by the load F. The axial force created by the feeding torque is much less than the load F.

Figure 18D:
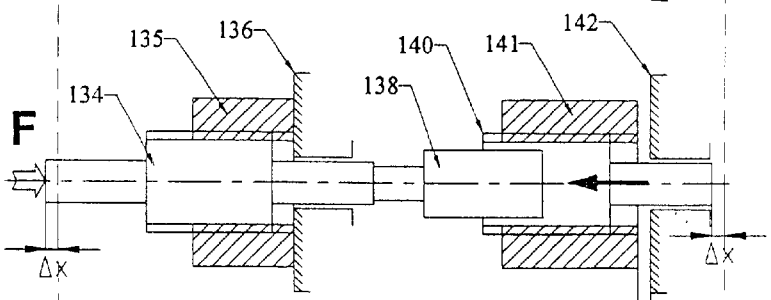
Figure 18E:
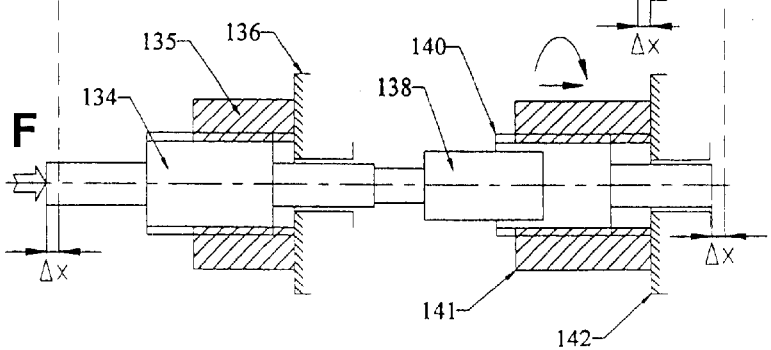

In FIG. 18(d), the actuator 138 makes contracts a distance of Δx to resume to its position as shown in FIG. 18(a). Because the actuator 138 is fixed to the shaft 134 and actuator holder 140 at its two ends, the contraction of the actuator 138 moves the actuator holder 140 and the feeding screw 141 to the left for a distance Δx from the support 142. The shaft 134 then supports the axial applied load F again under the assistance of the self-lock effect induced between the shaft 134 and the feeding screw 135. In FIG. 18(e), the feeding screw 141 turns back to come in contact with the support 142 again. As in FIG. 18(c), the small feeding torque in FIG. 18(e) can only rotate the feeding screw 141 without axially moving the actuator holder 140. In FIG. 18(e), the shaft 134, the actuator 138, the actuator holder 140 and the applied load have been pushed ahead for a distance of Δx. Continuing the process from FIGS. 18(a) to 18(e), the linear motor of the second exemplary embodiment may move ahead step by step with the given size Δx.

Figure 19A:
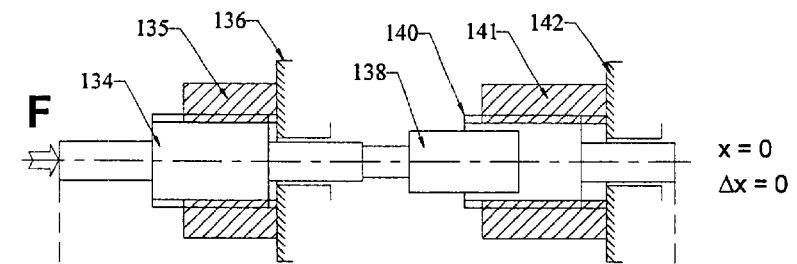
FIGS. 19(a)–19(k) illustrate the driving mechanism of the reverse operation of the second exemplary embodiment shown in FIG. 16.
Figure 19B:
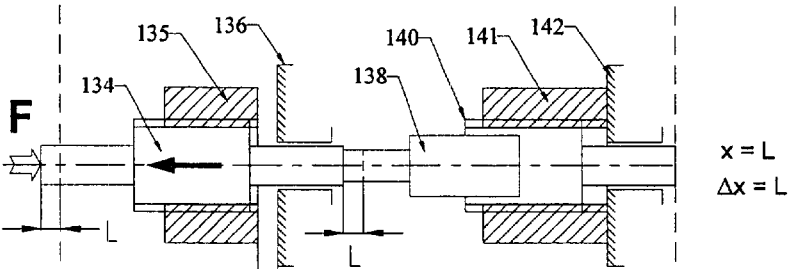
Figure 19C:
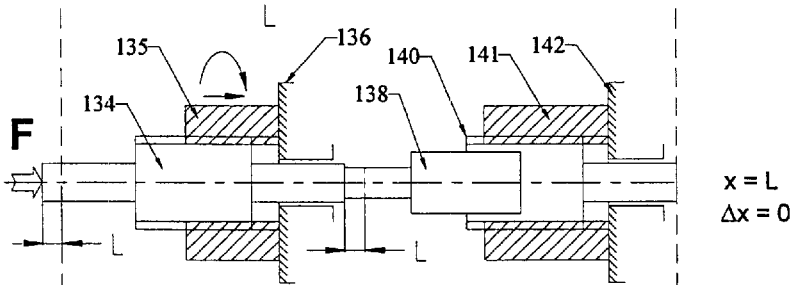

FIGS. 19(a) to 19(k) illustrate the reverse operation of the second exemplary embodiment, in which the intended displacement is in the direction of the applied load F. To begin with, the piezoelectric actuator 138 should extend a length of L, which is limited by the following equation. The preparatory operation is shown in FIG. 19(a) to FIG. 19(c). The load F is pushed ahead for a distance of L.

$$S-a>L>d$$

where
S—the stroke of the used piezo-actuator;
d—the motion step size;
a—the sum of all possible losses, e.g. elastic contact deformation, screw deflection.

Figure 19D:
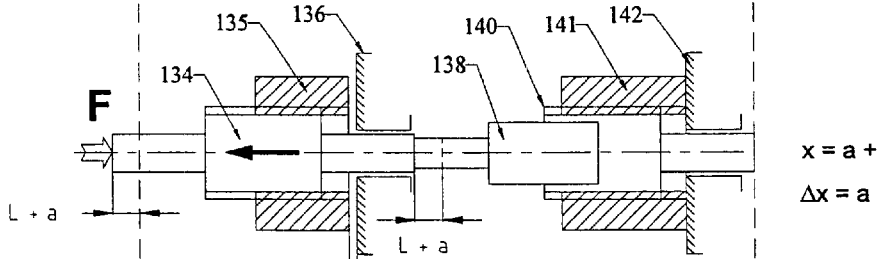
Figure 19E:
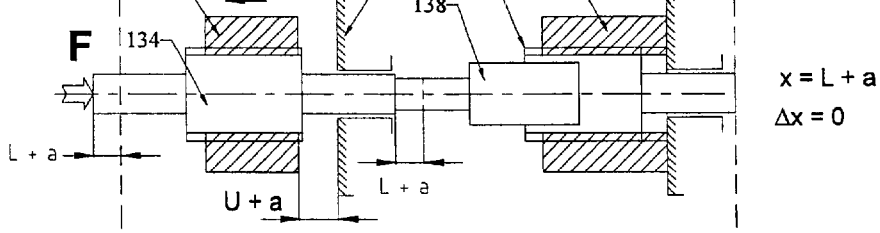
Figure 19F:
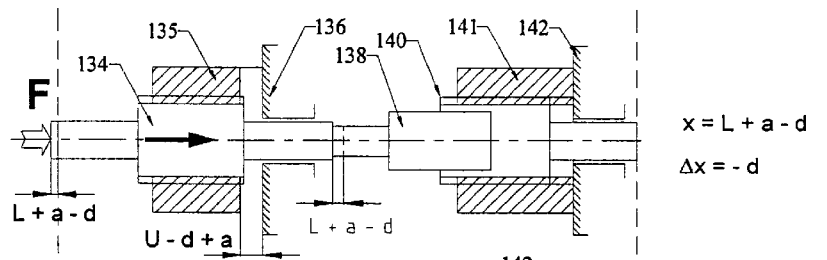

As shown in FIG. 19(d), in order to turn the feeding screw 135 ahead to move it out of contact from the support 136, the actuator 138 is extended a length of a to counteract the axially applied load totally under the aid of self-lock effect induced between the actuator container 140 and the feeding screw 41. In FIG. 19(e), the feeding screw 135 revolves to move to the left. The horizontal distance between the feeding screw 135 and the support 136 is u+a, where u is an arbitrary value which is larger than the motion step size d. For easy operation, the value of u can vary from time to time as long as the value of u is much larger than that of d. In FIG. 19(f), the actuator 138 contracts a distance of −d, where the minus sign represents the reverse movement. Compared to FIG. 19(c), the position of the left end of the shaft 134 is L+a−d.

Figure 19G:
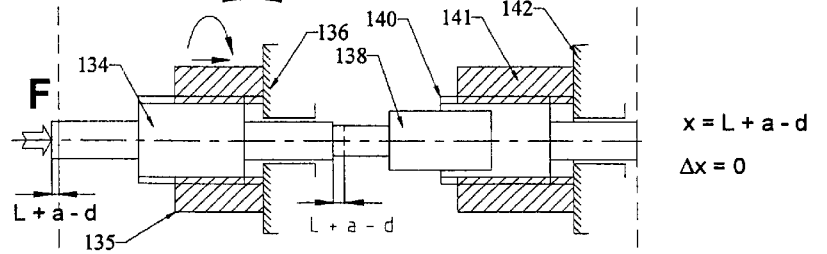
Figure 19H:
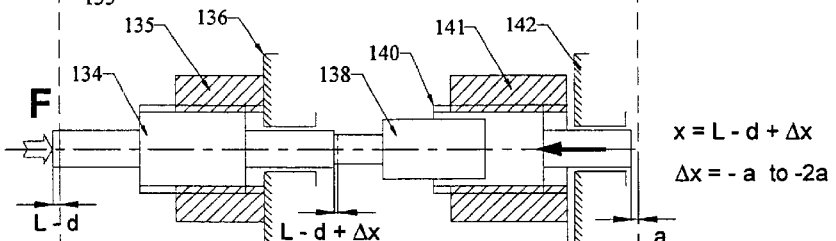
Figure 19I:
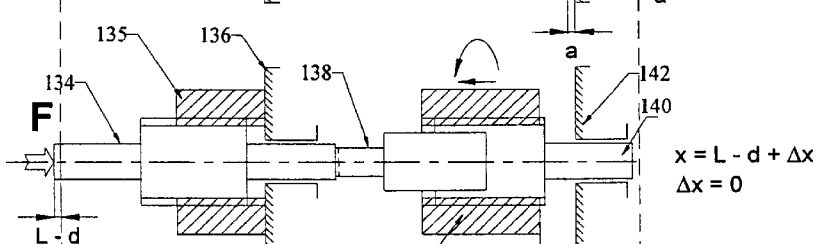
Figure 19J:
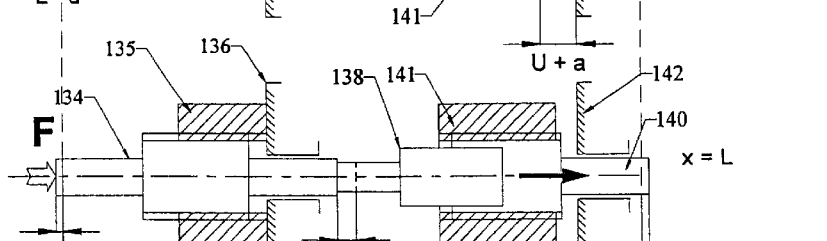
Figure 19K:
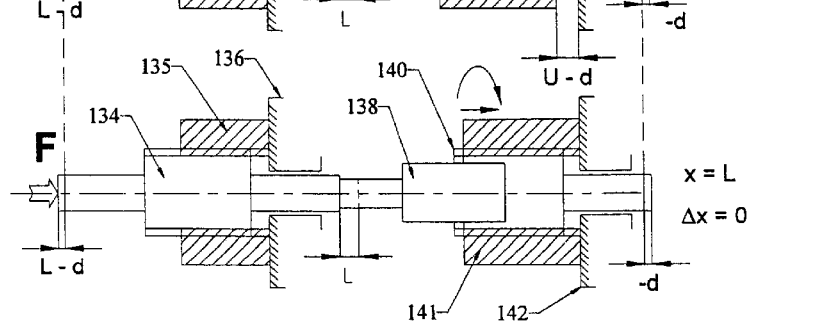

In FIG. 19(g), the feeding screw 135 revolves back slowly until it comes in contact with the support 136. In FIG. 19(h), the actuator 138 contracts again for a distance from a to 2a so that the feeding screw 141 is free from the axial applied load. Because the left tip of the actuator 138 is bonded to the right end of the shaft 143, the contraction separates the feeding screw 141 from the support 142. The feeding screw 135 supports the total axial load F under the assistance of the induced self-lock effect. In the meantime, the extension of a in FIG. 19(d) is compensated by the contact deformation between part 135 and 136. The position of the left end of part 134 is L−d. In FIG. 19(i), the feeding screw 141 turns to move to the left until the horizontal distance u is larger than the linear motion step size d. In FIG. 19O), the actuator 138 extends until it resumes its extension of L. Compared with its previous position, the actuator 138 and actuator container 140 move a distance of −d in the reverse direction. In FIG. 19(k), the feeding screw 141 revolves back slowly until it comes in contact with the support 142. From FIG. 19(c) to FIG. 19(k), the shaft 134, the actuator 138 and the actuator container 140 have moved in the reverse direction for a distance of −d. Going to FIG. 19(*d*) to continue the procedures, the linear motor will move step by step with the given step size of −d in the reverse direction.

Figure 20:
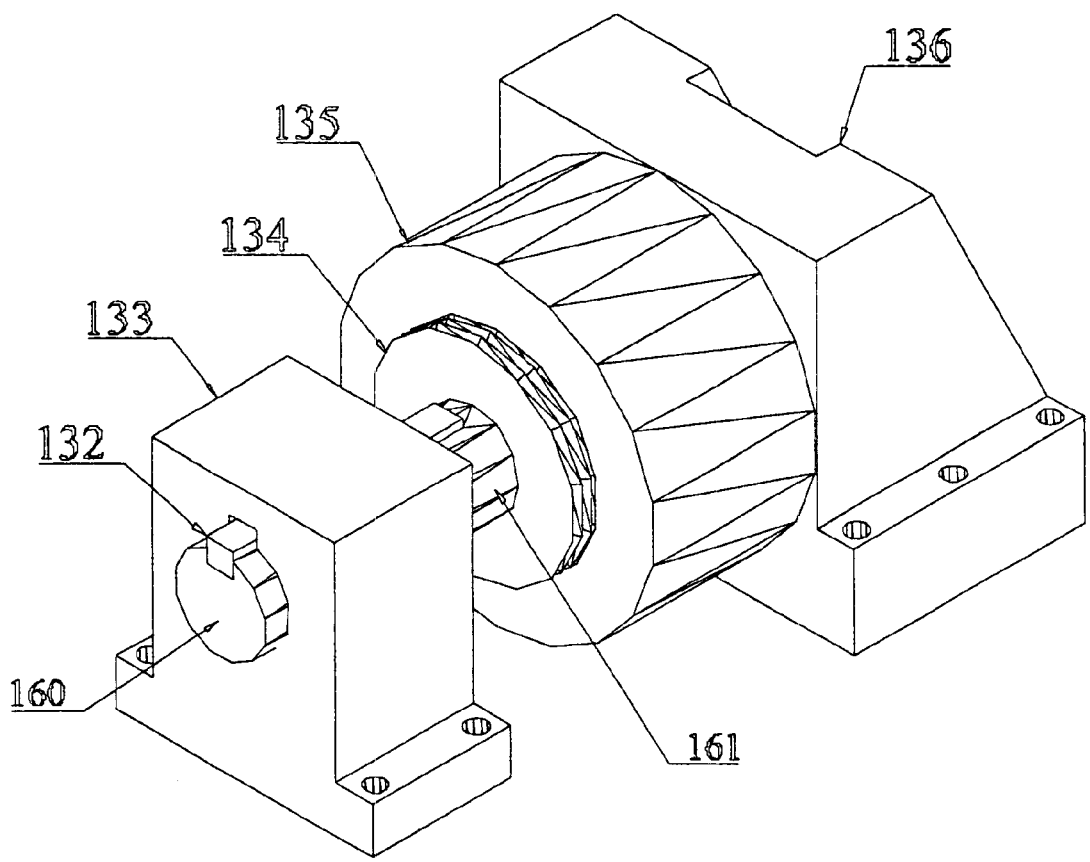
FIG. 20 illustrates a perspective view of the output group of the second exemplary embodiment shown in FIG. 16.

FIG. 20 illustrates a perspective view of the output group of the linear piezoelectric motor 100. The output shaft 134 is able to slide along the guide ways provided by the output support 133 and the support 136, but is restricted from rotating around its axis due to the key 132.

Figure 21:
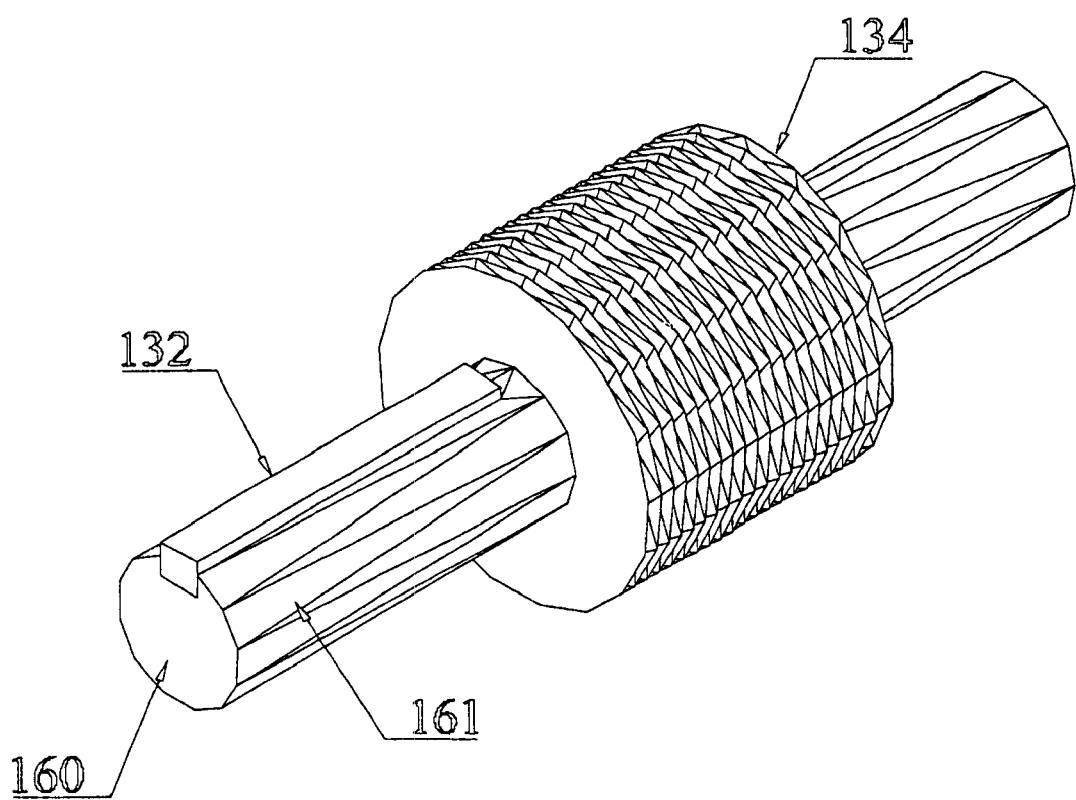
FIG. 21 illustrates a perspective view of the output shaft and key.
Figure 22:
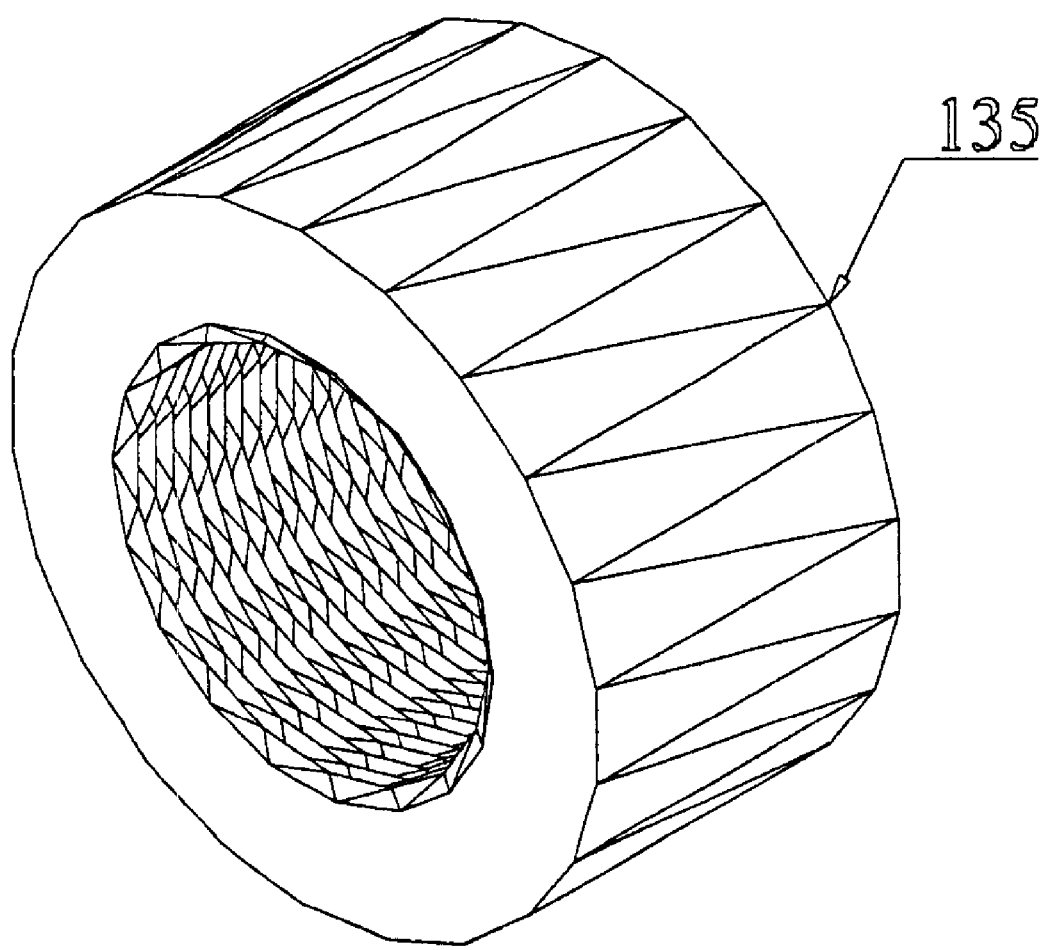
FIG. 22 illustrates a perspective view of the feeding screw.

FIG. 21 illustrates a perspective view of the shaft 134 and the key 132. As shown in FIG. 21, the output shaft 134 and the key 134 are connected to cylinderical rod 160. The key 134 is placed within a groove formed on the outer surface of the cylinderical rod 160 so that a portion of the key protrudes out from the groove portion. As shown in FIGS. 20 and 21, The shaft 134 is exposed to an axial load which is applied to one end 160 of the rod portion 161 of the shaft 134, wherein the exemplary embodiment it is the end located near the support 133. The shaft 134 is exposed to an axial force by the actuator 138 on the opposite end, in the exemplary embodiment it is the end located near the support 136. The feeding screw 135 engages with the threads on the outer portion of the output shaft 134. When the actuator 138 is in a contracted position, the contraction causes the feeding screw 135 to counteract the axial load of the actuator 138, by bearing against support 136 as shown in FIG. 20. FIG. 22 illustrates a perspective view of the feeding screw 135.

Figure 23:
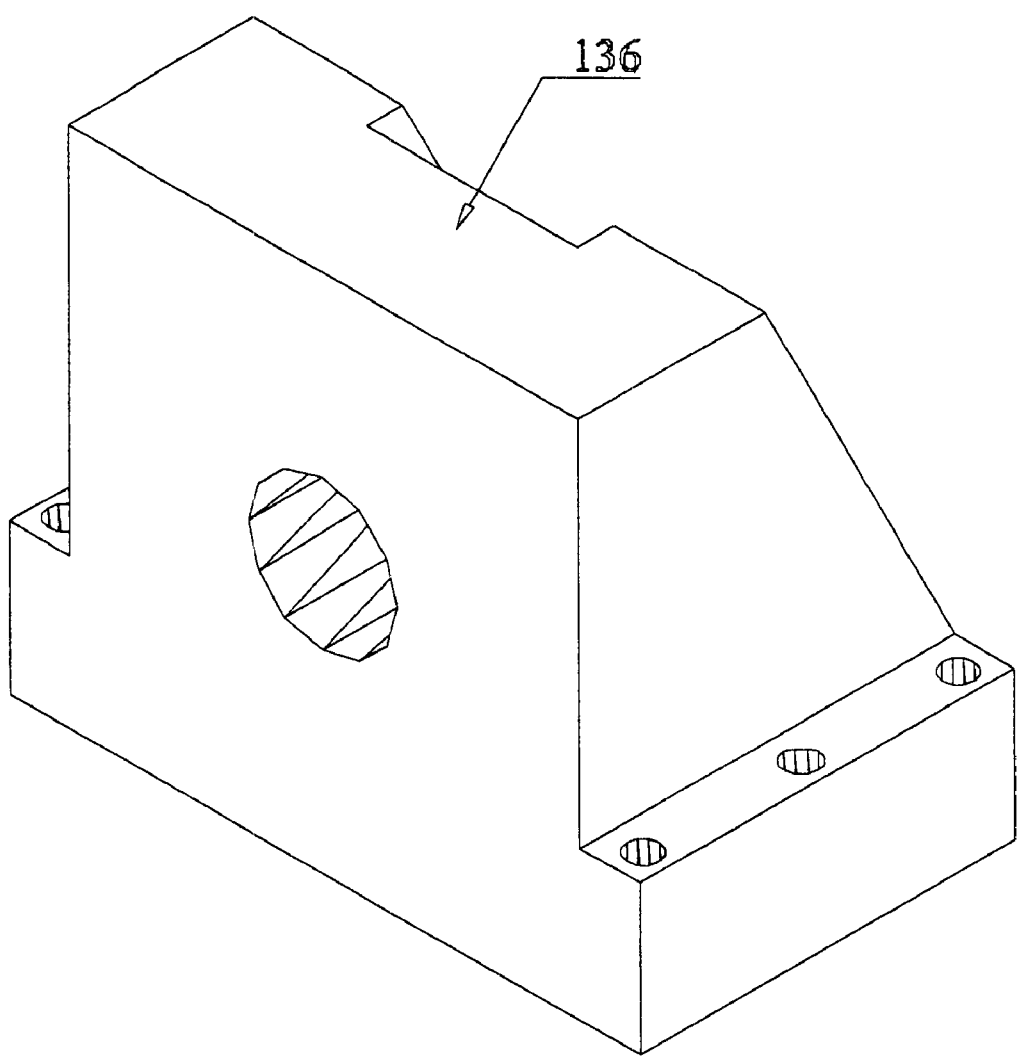
FIG. 23 illustrates a perspective view of the support.
Figure 24:
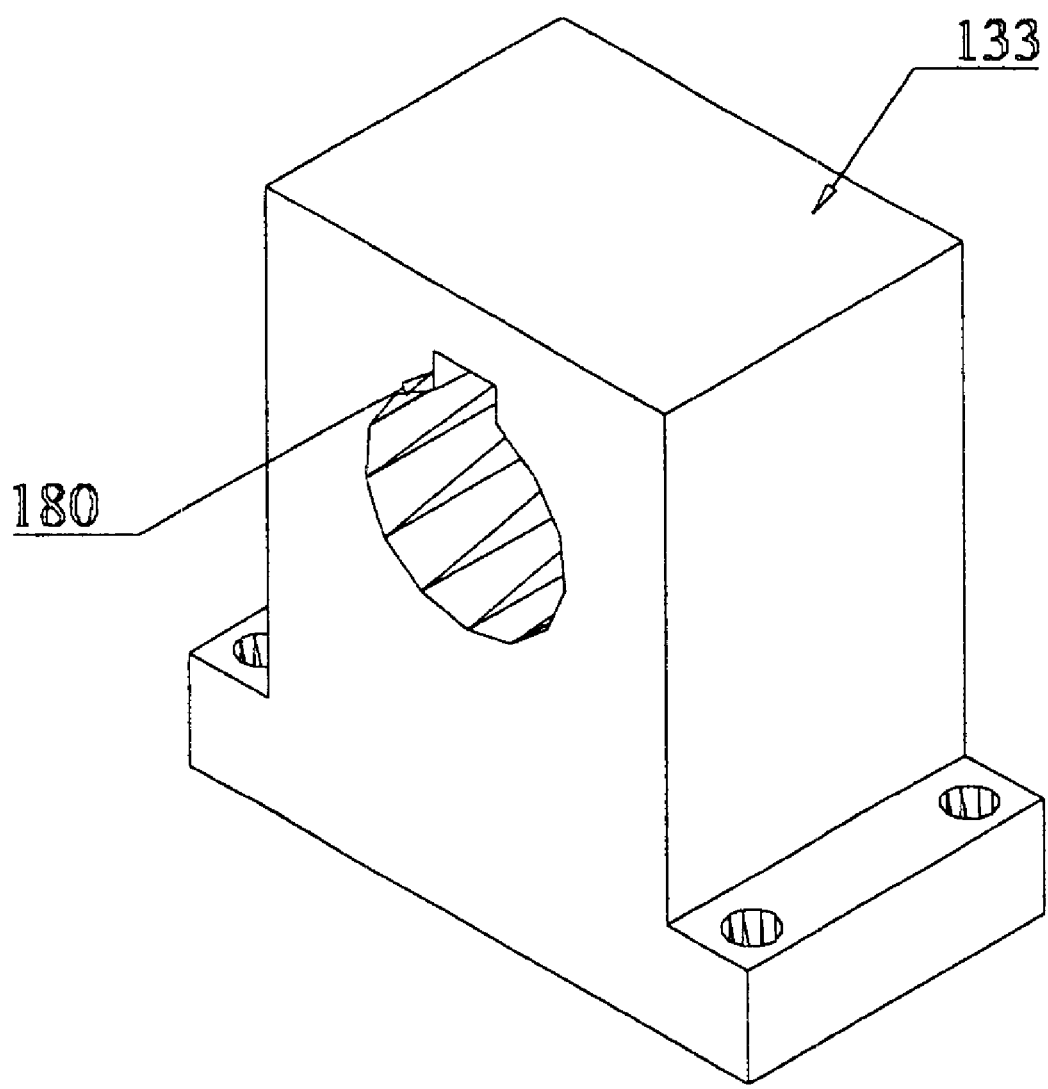
FIG. 24 illustrates a perspective view of the support.

FIG. 23 illustrates a perspective view of support 136 and FIG. 24 illustrates a perspective view of the support 133. As shown in FIGS. 23 and 24, the supports 133 and 136 each include an opening which is able to receive a respective end of the cylinderical rod 160. Support 133 shown in FIG. 24, includes a slotted portion 180 is configured to receive key 133.

Figure 25:
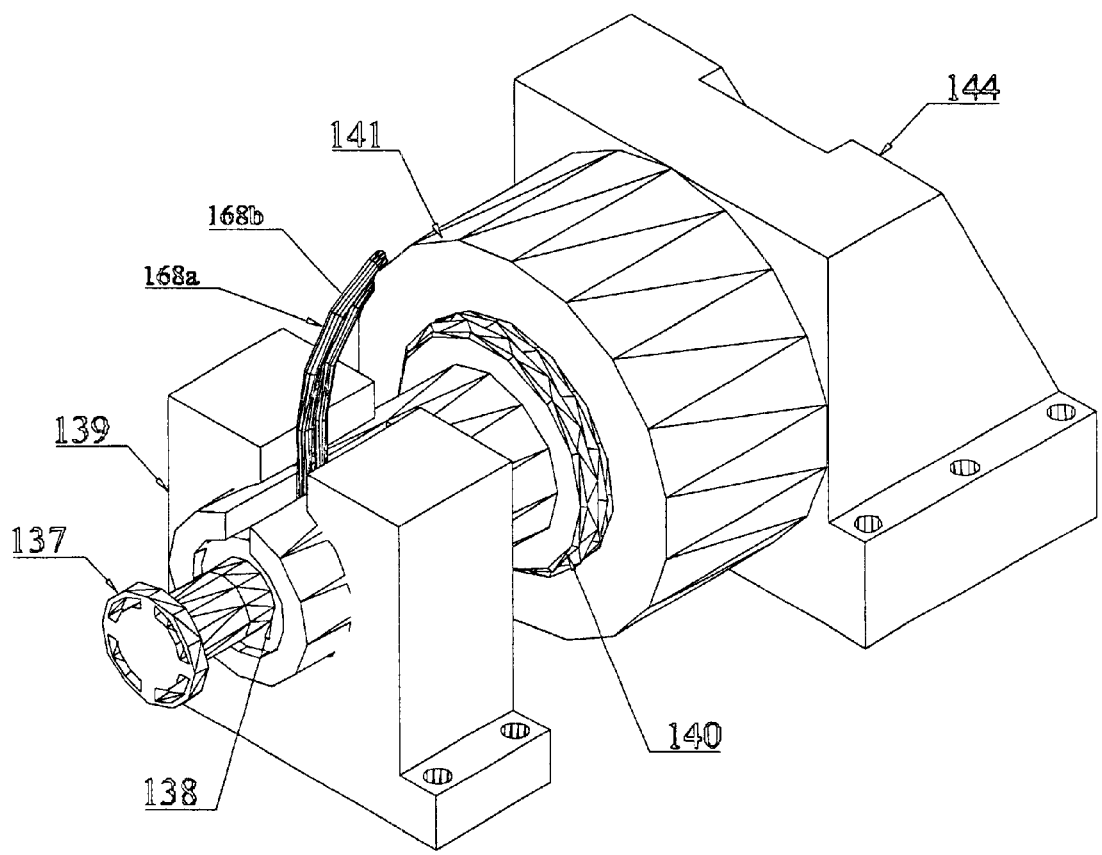
FIG. 25 illustrates a perspective view of the input group of the second exemplary embodiment shown in FIG. 16.
Figure 26:
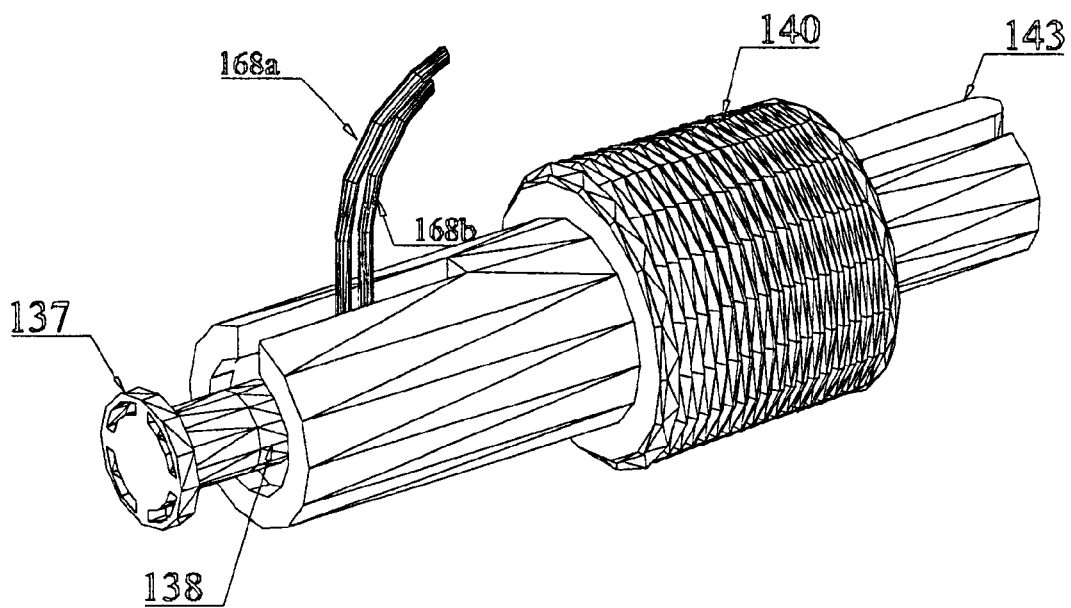
FIG. 26 illustrates a perspective view of the assembly of the actuator, actuator holder, contact cap and key.

FIG. 25 illustrates a perspective view of the input group. As shown in FIG. 25, the actuator 138 is covered by the actuator container 140 and the feeding screw 141. At one end of the actuator 138 is a contact cap 137. The contact cap 137 is the portion which connects the output group with the input group. As shown in FIG. 26, the actuator container 140 includes a slotted portion which allows the power cable 168*a* and the signal cable 168*b* to connect to the actuator 138. Furthermore, the input group also includes a key 143, which restricts the movement of the actuator container from rotating about its own axis.

Figure 27:
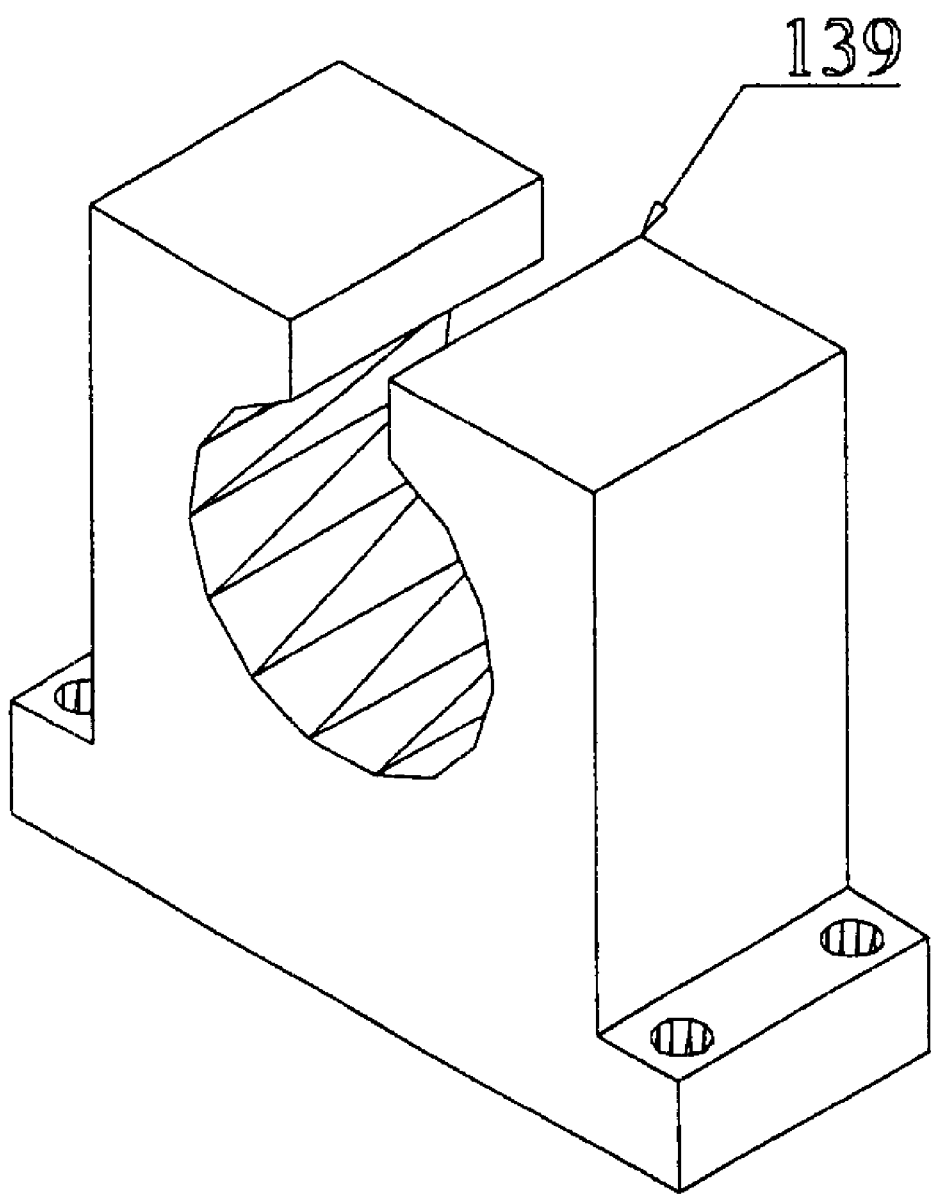
FIG. 27 illustrates a perspective view of the support.
Figure 28:
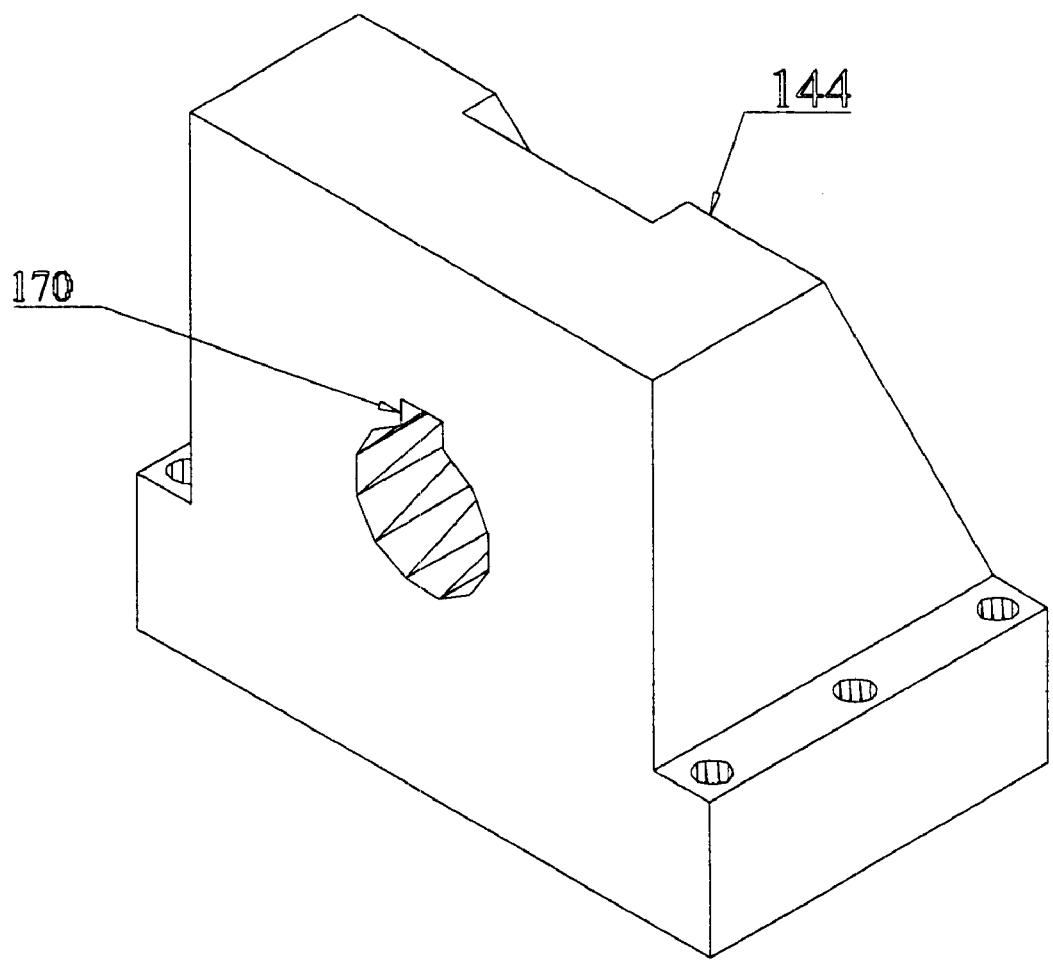
FIG. 28 illustrates a perspective view of the support.

FIGS. 27 and 28 are perspective views of the supports 139 and 144, respectively. As shown in the FIGS. 27 and 28, each of the supports 139 and 144 include an opening which is able to receive a respective end of the actuator container 140. Furthermore, support 144 includes a slotted portion around the outer periphery of the opening which is able to receive the key 143.

Figure 29:
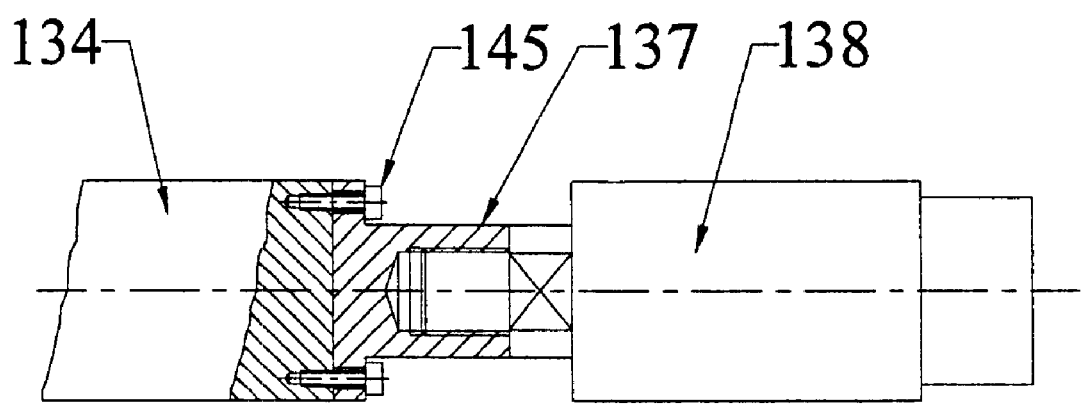
FIG. 29 illustrates a side view of the connection between the actuator and the output shaft.
Figure 30:
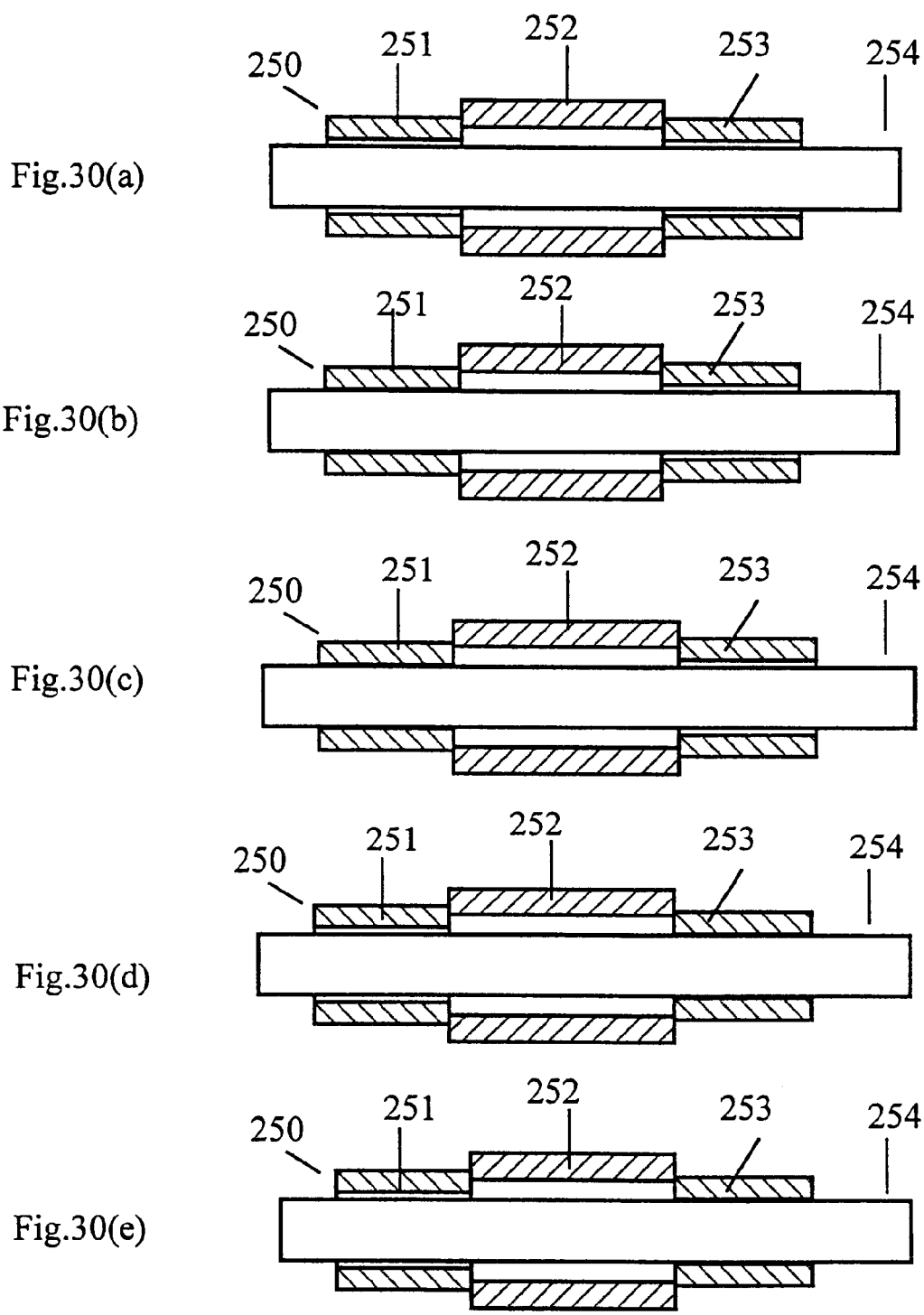
FIG. 30 illustrates the operation of the driving mechanism of the prior art of an inchworm.
Figure 31:
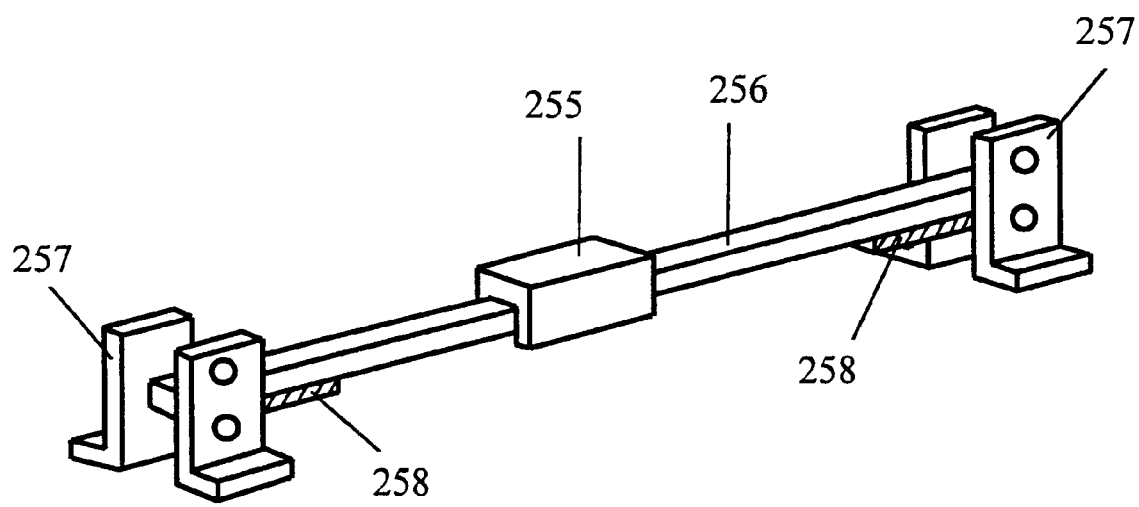
FIG. 31 illustrates a perspective view a linear ultrasonic motor according to the prior art.
Figure 32:
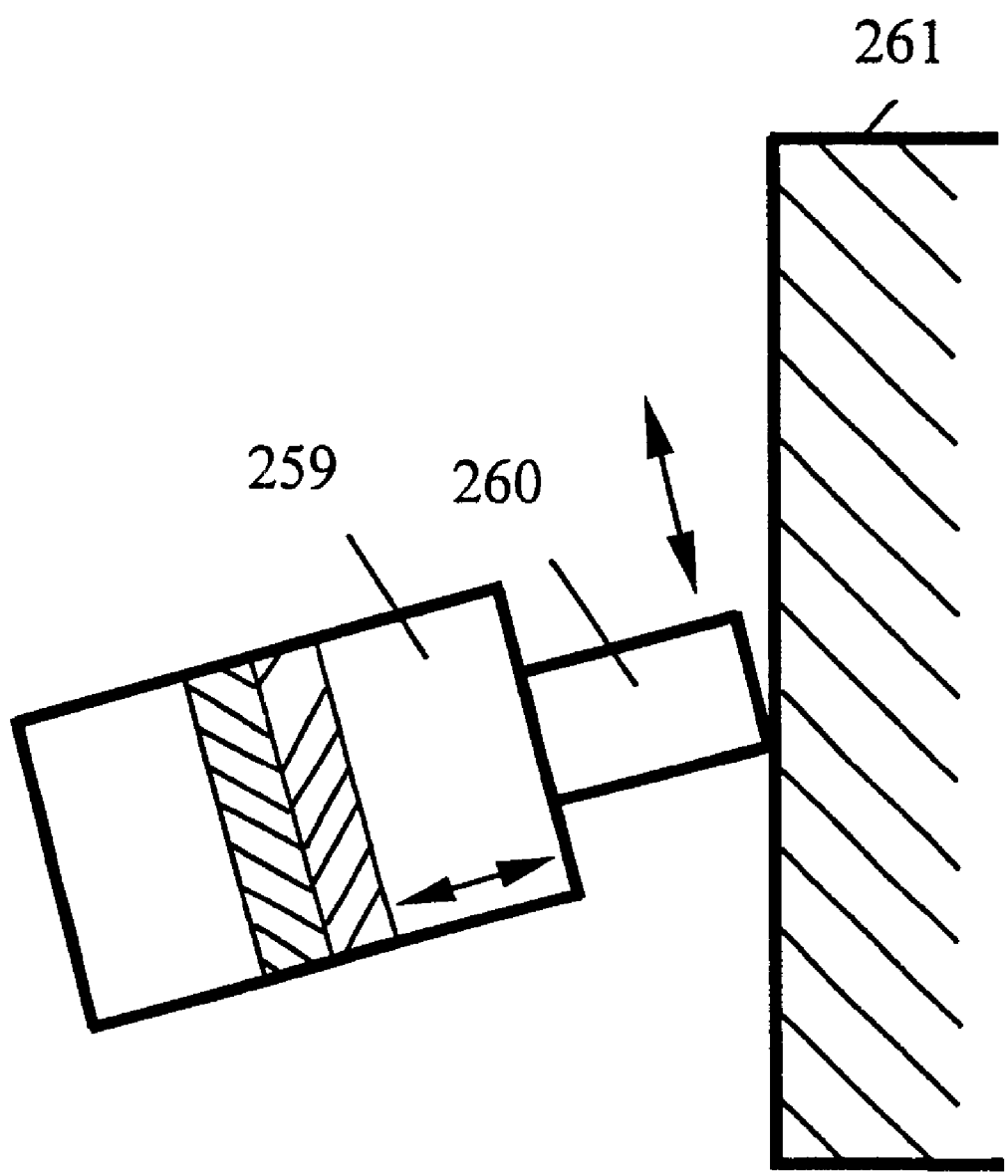
FIG. 32 illustrates the driving principle of a reed type ultrasonic motor according to the prior art.
Figure 33:
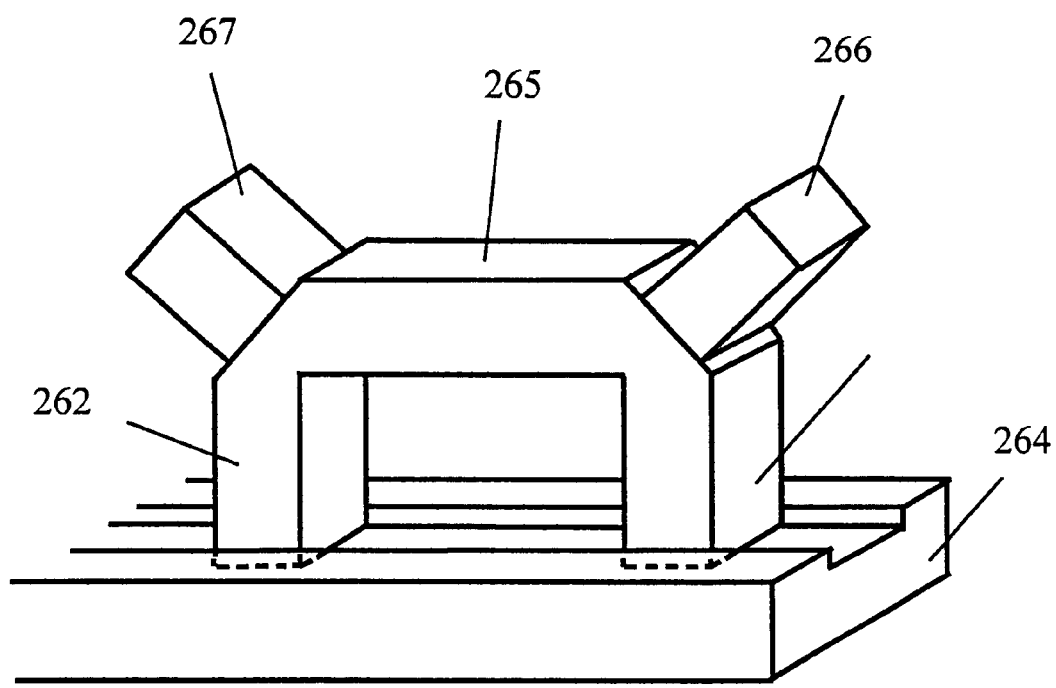
FIG. 33 illustrates a perspective view of another prior art.

FIG. 29 is a side sectional view of the connection between the actuator 138 and the output shaft 134. The contact cap 137 is connected to the screw of the actuator 38 on one end of the contact cap 137. On the opposite end of the contact cap 137, the contact cap 137 is fixed one end of the output shaft 134 by connection means, wherein the exemplary embodiment the connection means a plurality of screws 145. Thus, a surface-to-surface contact between the output shaft 134 and the contact cap 137 is achieved. Furthermore, the actuator 138 and the output shaft 134 share a common axis.

What is claimed is:

1. A linear piezoelectric motor, comprising:
   a piezoelectric actuator;
   an actuator container for containing the piezoelectric actuator, the actuator container having a sloped surface at one end and being slidable along a linear axis;
   an input slope member that includes a sloped surface which cooperates with the sloped surface of the actuator container;
   an output bar, having one end coupled to the actuator container and aligned with the linear axis, having a load applied to the opposite end of the output bar, and having at least one sloped surface; and
   an output slope member which cooperates with the sloped surface of the output bar.

2. The linear piezoelectric motor according to claim 1, wherein the end of the output bar that comes m contact with the actuator includes a contact cap which is fastened to the output bar.

3. The linear piezoelectric motor according to claim 1, wherein an end portion of the actuator which comes in contact with the output bar includes a contact cap.

4. The linear piezoelectric motor according to claim 1, wherein at least one cylindrical portion of the output bar corresponds with the sloped surface of the output slope member.

5. The linear piezoelectric motor according to claim 2, wherein the contact cap, the output bar and the piezoelectric actuator are axially aligned along the linear axis.

6. The linear piezoelectric motor according to claim 1, wherein the input slope member and the sloped surface of the actuator container provide a self lock effect.

7. The linear piezoelectric motor according to claim 1, wherein the output slope member and the input slope member slope are able to move in a vertical direction with respect to a base.

8. The linear piezoelectric motor according to claim 1, wherein the output slope member includes a sloped surface which has an angle which complements and cooperates with the sloped surface of the output bar.

9. The linear piezoelectric motor according to claim 1, wherein the input slope member includes a sloped surface which has an angle which complements and cooperates with the sloped surface of the actuator container.

10. A linear piezoelectric motor, comprising:
    a piezoelectric actuator;
    an actuator container which holds and contains the piezoelectric actuator;
    an actuator feeding screw which engages the actuator container and contacts a feeding support;
    an output shaft, which is axially aligned with the piezoelectric actuator and the actuator container;
    an output feeding screw, which engages the output shaft and contacts an output feeding support;
    wherein the movement of the piezoelectric actuator, the actuator feeding screw, and the output feeding screw displace the output shaft.

11. The linear piezoelectric motor according to claim 10, further comprising a contact cap which connects the output shaft with the actuator container so that both the actuator container and output shaft share an axis and a surface contact is achieved.

12. The linear piezoelectric motor according to claim 10, wherein the actuator feeding screw and the output feeding screw provide a self lock effect.

13. The linear piezoelectric motor according to claim 10, wherein at least one motor is provided to rotate the feeding screws.

14. The linear piezoelectric motor according to claim 13, wherein the at least one motor and the feeding screws are connected by at least one belt.

15. The linear piezoelectric motor according to claim 13, wherein the actuator feeding screw and the output feeding screw each are powered by a respective motor.

* * * * *

UNITED STATES PATENT AND TRADEMARK OFFICE
CERTIFICATE OF CORRECTION

| | |
|---|---|
| PATENT NO. | : 6,611,080 B2 |
| DATED | : August 26, 2003 |
| INVENTOR(S) | : Bryan Kok Ann Ngoi, Lennie Enk Ng Lim and Lin Wu |

It is certified that error appears in the above-identified patent and that said Letters Patent is hereby corrected as shown below:

<u>Title page,</u>
Item [75], Inventor, the correct spelling of the first inventor is
-- Bryan Kok Ann Ngoi --.
The correct format for the third inventor's name is -- Lin Wu -- (Wu being his last name).

Signed and Sealed this

Second Day of December, 2003

JAMES E. ROGAN
*Director of the United States Patent and Trademark Office*